United States Patent
Wang et al.

(10) Patent No.: US 12,200,100 B2
(45) Date of Patent: Jan. 14, 2025

(54) CRYPTOGRAPHICALLY SECURE CONTROL USING SECURE MULTI-PARTY COMPUTATION

(71) Applicant: GOOGLE LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/927,049

(22) PCT Filed: Aug. 22, 2022

(86) PCT No.: PCT/US2022/041025
§ 371 (c)(1),
(2) Date: Nov. 22, 2022

(87) PCT Pub. No.: WO2023/027982
PCT Pub. Date: Mar. 2, 2023

(65) Prior Publication Data
US 2024/0195603 A1    Jun. 13, 2024

(30) Foreign Application Priority Data
Aug. 22, 2021    (IL) .......................................... 285766

(51) Int. Cl.
H04L 9/00    (2022.01)
(52) U.S. Cl.
CPC .......... H04L 9/008 (2013.01); H04L 2209/46 (2013.01)
(58) Field of Classification Search
CPC ..... H04L 9/008; H04L 2209/46; H04L 9/085; H04L 2209/50
See application file for complete search history.

(56) References Cited

U.S. PATENT DOCUMENTS 10,608,811 B2 *   3/2020   Chen ..................... H04L 9/0861
11,616,643 B2 *   3/2023   Be'ery ................... G06Q 20/02
                                                   713/171
(Continued)

FOREIGN PATENT DOCUMENTS

EP         3754898         12/2020
JP         2016-510912      4/2016
(Continued)

OTHER PUBLICATIONS

Office Action in Israeli Appln. No. 285766, mailed on Nov. 13, 2023, 4 pages.
(Continued)

*Primary Examiner* — S M A Rahman
(74) *Attorney, Agent, or Firm* — Fish & Richardson P.C.

(57) ABSTRACT

This document describes systems and techniques for using secure MPC to select digital components in ways that preserve user privacy and protects the security of data of each party that is involved in the selection process. In one aspect, a method includes obtaining, by a first computer of a secure multi-party computation (MPC) system, at least a first share of a set of contextual properties of an environment in which a selected digital component will be displayed at a client device. For each digital component in a set of digital components, at least a first share of an eligibility expression that defines a relationship between a set of eligibility criteria for the digital component is obtained. A determination is made, based on the at least first share of the set of contextual properties and the at least first share of the eligibility expression, a first share of an eligibility parameter.

20 Claims, 7 Drawing Sheets

(56) References Cited

U.S. PATENT DOCUMENTS

2017/0293763 A1* 10/2017 Shear .................. G06F 21/316
2019/0042788 A1   2/2019 Cho et al.

FOREIGN PATENT DOCUMENTS

| JP | 2019-500645 | 1/2019 |
|---|---|---|
| WO | WO 2016148281 | 9/2016 |
| WO | WO 2021162738 | 8/2021 |

OTHER PUBLICATIONS

Amturing.acm.org [online], "John Cocke" Mar. 2012, retrieved on Dec. 28, 2022, retrieved from URL <https://amturing.acm.org/award_winners/cocke_2083115.cfm>, 2 pages.

Debray, "Compiler optimizations for low-level redundancy elimination: An application of meta-level prolog primitives." International Workshop on Meta-Programming in Logic. Springer, Berlin, Heidelberg, Jun. 1992, 15 pages.

Github.com [online], "Dovekey" Sep. 2020, retrieved on Dec. 28, 2022, retrieved from URL <https://github.com/google/ads-privacy/tree/master/proposals/dovekey>, 7 pages.

Github.com [online], "Dovekey_auction.md" Jan. 2021, retrieved on Dec. 28, 2022, retrieved from URL <https://github.com/google/ads-privacy/blob/master/proposals/dovekey/dovekey_auction.md>, 9 pages.

Github.com [online], "Dovekey_auction_secure_2pc.md" Mar. 2021, retrieved on Dec. 28, 2022, retrieved from URL <https://github.com/google/ads-privacy/blob/master/proposals/dovekey/dovekey_auction_secure_2pc.md>, 18 pages.

Ho et al., "A Common Subexpression Sharing Approach for Multiplierless Synthesis of Multiple Constant Multiplications." Eng. Lett. 15.1, Aug. 2007, 149-156.

Wikipedia.org [online], "Common subexpression elimination" Mar. 2004, retrieved on Dec. 28, 2022, retrieved from URL <https://en.wikipedia.org/wiki/Common_subexpression_elimination>, 2 pages.

International Search Report and Written Opinion in International Appln. No. PCT/US2022/041025, mailed on Dec. 5, 2022, 17 pages.

Pfenning, "Lecture Notes on Common Subexpression Elimination." 15-411 Compiler Design, Lecture 18, Oct. 29, 2015, 12 pages.

Reinhardt et al., "Op4 : An OPPortunistic Privacy-Preserving Scheme for Crowdsensing Applications" 2016 IEEE 41st Conference on Local Computer Networks, Nov. 2016, 460-468.

Wikipedia.org [online], "Bloom Filter" Apr. 2004, retrieved on Dec. 28, 2022, retrieved from URL <https://en.wikipedia.org/wiki/Bloom_filter>, 24 pages.

Wikipedia.org [online], "Electronic design automation" Apr. 2003, retrieved on Dec. 28, 2022, retrieved from URL <https://en.wikipedia.org/wiki/Electronic_design_automation>, 7 pages.

Wikipedia.org [online], "Karnaugh map" Sep. 2002, retrieved on Dec. 28, 2022, retrieved from URL <https://en.wikipedia.org/wiki/Karnaugh_map>, 11 pages.

Wikipedia.org [online], "Logic optimization" Oct. 2006, retrieved on Dec. 28, 2022, retrieved from URL <https://en.wikipedia.org/wiki/Logic_optimization>, 6 pages.

Wikipedia.org [online], "Truth table" Jul. 2001, retrieved on Dec. 28, 2022, retrieved from URL <https://en.wikipedia.org/wiki/Truth_table>, 11 pages.

Zhang et al., "Common Subexpression Elimination and SAT Problem Solving" retrieved from URL <https://cse.hkust.edu.hk/krw/resources/Yuanlin%20Zhang.pdf>, 21 pages.

International Preliminary Report on Patentability in International Appln. No. PCT/US2022/041025, mailed on Mar. 7, 2024, 10 pages.

Office Action in Japanese Appln. No. 2023-516600, mailed on Jun. 10, 2024, 5 pages (with English translation).

* cited by examiner

CRYPTOGRAPHICALLY SECURE CONTROL USING SECURE MULTI-PARTY COMPUTATION

CROSS-REFERENCE TO RELATED APPLICATIONS

This application is a National Stage Application under 35 U.S.C. § 371 and claims the benefit of International Application No. PCT/US2022/041025, filed Aug. 22, 2022, which claims the benefit of priority to Israeli Application Serial No. 285766, filed Aug. 22, 2021, both of which are incorporated by reference herein in their entireties and for all purposes.

TECHNICAL FIELD

This specification is related to cryptography and data security.

BACKGROUND

Secure multi-party computation (MPC) is a family of cryptographic protocols that prevents access to data by distributing a computation across multiple parties such that no individual party can access another party's data or intermediate computed values, while outputs are released only to designated parties. The MPC computing systems typically perform the computations using secret shares or other encrypted forms of the data and secure exchange of information between the parties.

SUMMARY

In general, one innovative aspect of the subject matter described in this specification can be embodied in methods that include obtaining, by a first computer of a secure multi-party computation (MPC) system that includes multiple computers, at least a first share of a set of contextual properties of an environment in which a selected digital component will be displayed at a client device: for each digital component in a set of digital components: obtaining at least a first share of an eligibility expression that defines a relationship between a set of eligibility criteria for the digital component: and determining, based on the at least first share of the set of contextual properties and the at least first share of the eligibility expression, at least a first share of an eligibility parameter that indicates whether the digital component is eligible for selection to be displayed at the client device: performing, by the first computer in collaboration with one or more second computers of the secure MPC system, a secure MPC process to select, as the selected digital component, a given digital component from a set of eligible digital components comprising each digital component having an eligibility parameter that indicates that the digital component is eligible for selection: generating, as a result of the secure MPC process, a first share of a selection result identifying the selected digital component: and sending, to the client device by the first computer, the first share of the selection result. Other implementations of this aspect include corresponding apparatus, systems, and computer programs, configured to perform the aspects of the methods, encoded on computer storage devices.

These and other implementations can each optionally include one or more of the following features. In some aspects, obtaining the at least first share of the set of contextual properties includes receiving a first secret share of the set of contextual properties from one of the client device or a content platform.

In some aspects, the at least first share of the set of contextual properties includes all of the contextual properties in the set of contextual properties: the at least first share of the eligibility expression includes an entirety of the eligibility expression: and determining the at least first share of the eligibility parameter that indicates whether the digital component is eligible for selection includes evaluating the eligibility expression based on the set of contextual properties in a sandbox environment isolated from other code execution.

In some aspects, determining, based on the at least first share of the set of contextual properties and the at least first share of the eligibility expression, the at least first share of the eligibility parameter that indicates whether the digital component is eligible for selection includes performing, in collaboration with the one or more second computers, a second secure MPC process to determine a first secret share of the eligibility parameter.

In some aspects, the at least first share of the set of eligibility criteria for a particular digital component includes a first secret share of the vector of properties for the particular digital component: the set of contextual properties includes a vector of the contextual properties: the eligibility expression for the particular digital component includes a set intersection check: and determining the at least first share of the eligibility parameter for the particular digital component includes determining, using a second secure MPC process in collaboration with the one or more second computers of the secure MPC system, that there is an intersection between at least one element of the vector of properties for the particular digital component and at least one element of the vector of the contextual properties.

In some aspects, the eligibility expression defines the vector of properties for the particular digital component as a block list in which the particular digital component is ineligible for selection when one or more elements of the vector of properties for the particular digital component matches one or more corresponding elements of the vector of the contextual properties and determining the at least first share of the eligibility parameter for the particular digital component includes setting a value of the at least first share of the eligibility parameter to indicate that the particular digital component is ineligible for selection to be displayed at the client device in response to determining that there is the intersection between the at least one element of the vector of properties for the particular digital component and the at least one element of the vector of the contextual properties.

In some aspects, the eligibility expression defines the vector of properties for the particular digital component as an enabled list in which the particular digital component is eligible for selection when one or more elements of the vector of properties for the particular digital component matches one or more corresponding elements of the vector of the contextual properties and determining the at least first share of the eligibility parameter for the particular digital component includes setting a value of the at least first share of the eligibility parameter to indicate that the particular digital component is eligible for selection to be displayed at the client device in response to determining that there is the intersection between the at least one element of the vector of properties for the particular digital component and the at least one element of the vector of the contextual properties.

In some aspects, the at least first share of the set of eligibility criteria for a particular digital component includes a first secret share of a first Bloom filter comprising properties for the particular digital component: the set of contextual properties includes a second Bloom filter comprising the contextual properties: the eligibility expression for the particular digital component includes a set intersection check: and determining the at least first share of the eligibility parameter for the particular digital component includes determining, using a second secure MPC process in collaboration with the one or more second computers of the secure MPC system, that there is an intersection between at least one element of the first Bloom filter and at least one element of the second Bloom filter.

In some aspects, the eligibility expression for a particular digital component includes a comparison between a given property for the digital component and a corresponding property of the set of contextual properties. In some aspects, the eligibility expression for a particular digital component includes an equality test between a given property for the digital component and a corresponding property of the set of contextual properties.

In some aspects, the eligibility expression for a particular digital component includes a truth table that defines when the particular digital component is eligible for selection. In some aspects, the eligibility expression includes a Boolean expression that includes two or more sub-expressions and a Boolean operator for each pair of sub-expressions. The two or more sub-expressions can include two or more of (i) a set intersection check, (ii) an equality test, and (iii) a comparison test.

In some aspects, the set of contextual properties comprises at least one of (i) data about a resource with which the selected digital component will be displayed, (ii) data about a user of the client device, (iii) data about an application that will display the digital component, or (iv) data about the client device.

The subject matter described in this specification can be implemented in particular embodiments so as to realize one or more of the following advantages. Using a secure MPC process performed by two or more computers of a secure MPC system operated by different parties to select digital components based on shares of user information ensures that the user information cannot be accessed in cleartext by either MPC computer or another party absent unauthorized collusion between the MPC computers. In this way, as long as at least one MPC server is honest, user data privacy is preserved. The secure MPC process can also use shares of information received from content platforms in the digital component selection to preserve the confidentiality of the content platforms' information such that the information is not accessible by either MPC computer or another entity that somehow obtains a share of the information.

In a digital component selection process, the MPC servers can select from eligible digital components that satisfy one or more eligibility conditions while preventing the parties from accessing user information in cleartext. The eligibility conditions can include restrictions and guidelines on the manner or frequency of distribution of a digital component, among other factors. The conditions can include user group membership, frequency control, muting (e.g., user blocking), k-anonymity for preventing micro-targeting of users, and/or pacing and budget constraints.

Another example eligibility condition relates to the context in which the digital component will be presented, e.g., the resource with which the digital component will be displayed, the geographic location of the client device that will display the digital component, and the spoken language setting of an application (e.g., browser) that will display the digital component. Digital component providers can also specify the context in which their digital components can and/or cannot be displayed. Similarly, resource publishers can specify features of digital components that can or cannot be displayed with their resources. Rather than use cache lookup keys that account for all the possible combinations of properties that can be used to identify digital components that are eligible for each digital component display opportunity that has its associated context, the criteria for a digital component can be defined using an expression that can be evaluated by the MPC computers, e.g., in secret shares using a secure MPC process. In this way, the amount of data stored by the MPC computers is reduced relative to the use of large cache lookup keys. This also increases the flexibility in the publisher and digital component provider control over the display of digital components, without increasing the data storage requirements of the MPC computers, which enables the MPC computers to store more digital components, information for the digital components, and/or other related information in high speed memory, e.g., in high speed caches.

As the selection of digital components is an online process that typically occurs at the time that content is being loaded at a client device, it is important that this process be completed quickly, e.g., within milliseconds. The techniques described in this document enhances the speed at which digital components are selected by reducing the size of data transmitted between the client device and the MPC cluster, by reducing the computational resources required by the MPC cluster, and by reducing the number of roundtrip communications performed by the servers of the MPC cluster and the size of data transmitted between the servers. The reduction in data size between the client device and server also reduces network bandwidth consumption and battery consumption of the client device, e.g., if the client device is a mobile device running on battery power.

The MPC cluster can transmit secret shares of a result that identifies a selected digital component that the MPC cluster selected using the secure MPC process. By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster by limiting the number of digital components for which information is provided to the client device.

Reducing the latency in content presentation also reduces the number of errors that occur at user devices while waiting for such content to arrive. As the content often needs to be provided in milliseconds and to mobile devices connected by wireless networks, reducing the latency in selecting and providing the content is critical in preventing errors and reducing user frustration.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, this document describes systems and techniques for using cryptography, secret sharing, and secure MPC to select digital components in ways that preserve user privacy and protects the security of data of each party that is involved in the selection process. The techniques described in this document allow for such privacy preservation and data security while still providing digital components in short time periods, e.g., within milliseconds, after a request is received and while minimizing the size of data sent to and from the client device that displays the digital component. The techniques also provide flexibility and security of rules and other data specified by content platforms and/or digital component providers for controlling the environments in which digital components are displayed and the digital components that are displayed with particular electronic resources, e.g., web pages and/or native application content.

Figure 1:
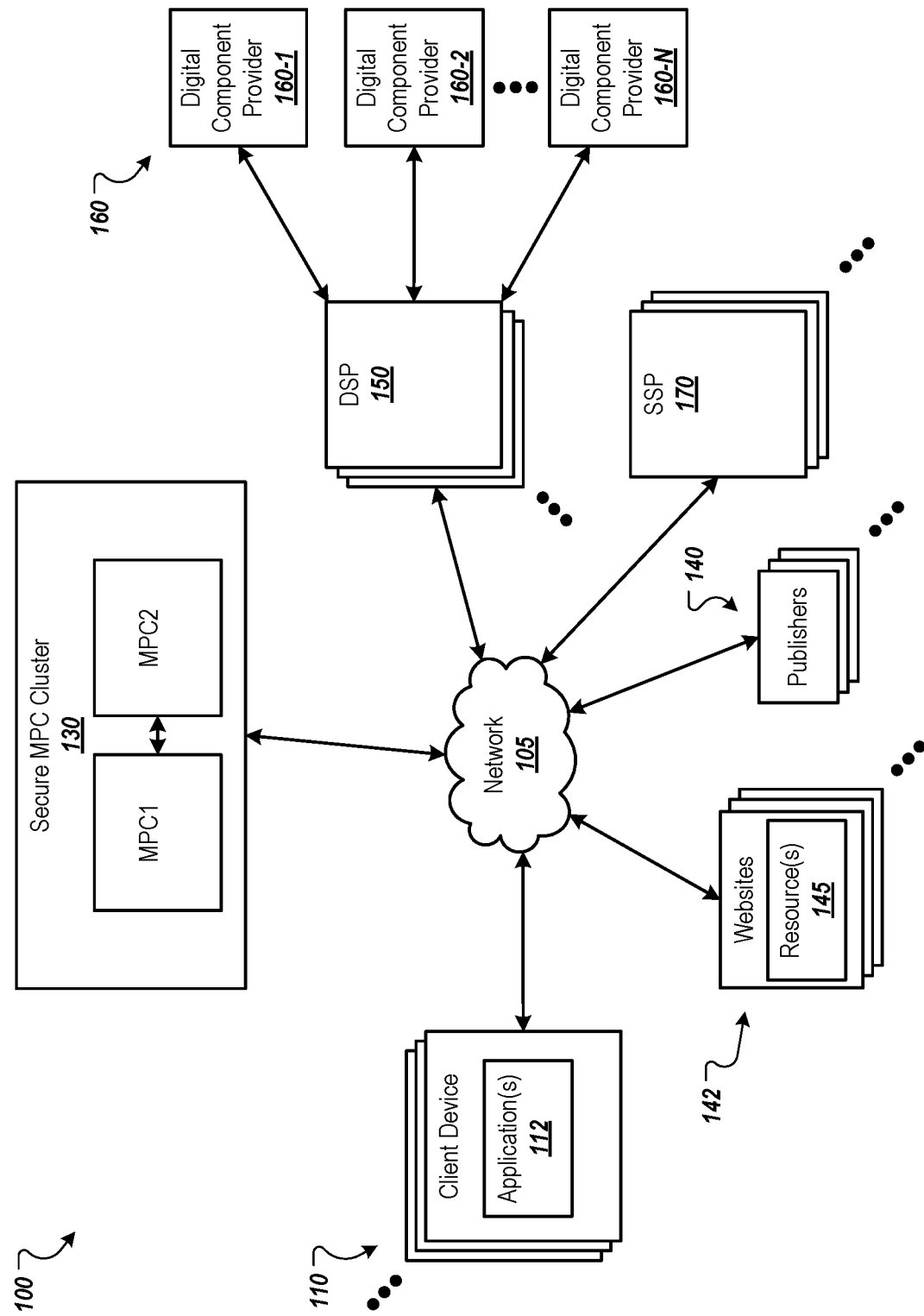
FIG. 1 is a block diagram of an environment in which an MPC cluster performs secure MPC processes to select digital components for distribution to client devices.

FIG. 1 is a block diagram of an environment 100 in which an MPC cluster 130 performs secure MPC processes to select digital components for distribution to client devices 110. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, content platforms, e.g., supply-side platforms (SSPs) 170 and demand-side platforms DSPs (150). The example environment 100 can include many different client devices 110, secure MPC clusters 130, publishers 140, websites 142, DSPs 150, and SSPs 170.

A website 142 includes one or more electronic resources 145. The resources 145 can be associated with a domain name, a resource identifier unique within the domain such as a path, and hosted by one or more servers. An example website is a collection of web pages formatted in hypertext markup language (HTML) that can contain text, images, multimedia content, and programming elements, such as scripts. Each website 142 is maintained by a content publisher 140, which is an entity that controls, manages and/or owns the website 142.

A resource 145 is any data that can be provided by the publisher 140 over the network 105 and can be associated with a resource address. Resources include HTML pages, word processing documents, and portable document format (PDF) documents, images, video, and feed sources, to name just a few. The resources 145 can include content, such as words, phrases, pictures, and so on, and may include embedded information (e.g., meta information and hyperlinks) and/or embedded instructions, e.g., scripts.

A client device 110 is an electronic device that is capable of communicating over the network 105. Example client devices 110 include personal computers, mobile communication devices, e.g., smart phones, and other devices that can send and receive data over the network 105. A client device 110 can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device 110 can also include a digital media device, e.g., a streaming device that plugs into a television or other display to stream videos to the television, a gaming system, or a virtual reality system.

A client device 110 typically includes applications 112, such as web browsers and/or native applications, to facilitate the sending and receiving of data over the network 105. A native application is an application developed for a particular platform or a particular device, e.g., for mobile devices having a particular operating system. Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for displaying digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page, application content (e.g., an application page), or other resource displayed by the application 112. More specifically, the digital component may include digital content that is relevant to the resource content, e.g., the digital component may relate to the same topic as the web page content, or to a related topic. The provision of digital components can thus supplement, and generally enhance, the web page or application content.

When the application 112 loads a resource (or application content) that includes one or more digital component slots, the application 112 can request a digital component for each slot. In some implementations, the digital component slot can include code, e.g., one or more scripts, that, when processed by the application 112, cause the application 112 to request a digital component for display to a user of the client device 110. As described below, the application 112 can request digital components from the MPC cluster 130 and/or one or more SSPs 170.

Some publishers 140 use an SSP 170 to manage the process of obtaining digital components for digital component slots of its resources 145 and/or applications 112. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are displayed in digital component slots of publishers' resources 145 and applications 112. For example, a digital component provider 160 can create digital components that include content related to the digital component provider 160. In a particular example, a digital component of a product manufacturer can include content related to the product.

The digital component providers 160 can use a DSP 150 to manage the provisioning of its digital components for display in digital component slots. A DSP 150 is a technology platform implemented in hardware and/or software that automates the process of distributing digital components for display with the resources and/or applications. A DSP 150 can interact with multiple SSPs 170 on behalf of digital component providers 160 to provide digital components for display with the resources 145 and/or applications 112 of multiple different publishers 140. In general, a DSP 150 can receive requests for digital components (e.g., from an SSP 170), generate (or select) a selection value for one or more digital components created by one or more digital component providers 160 based on the request, and provide data related to the digital component (e.g., the digital component itself, or a creative element that includes code that enables the digital component to be downloaded) and the selection value to an SSP 170. The selection value can be an amount that the digital component provider 160 is willing to provide for display or user interaction with the digital component. The SSP 170 can then select a digital component for display at a client device 110 and provide, to the client device 110, data that causes the client device 110 to display the digital component, e.g., by providing the digital component or the code that enables download of the digital component. As described in more detail below, the MPC cluster 130 can select digital components for the client device 110 to display in a manner that preserves user privacy.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users (e.g., that have performed similar actions or visited similar electronic resources, or other group types involving similar user data. For example, users can be added to user groups when the users visit particular resources or perform particular actions at the resource (e.g., interact with a particular item displayed on a web page or add the item to a virtual cart). The user groups can be generated and updated by the digital component providers 160. That is, each digital component provider 160 can assign users to their user groups when the users visit electronic resources of the digital component providers 160. The user groups can also be created by and/or updated by the content platforms, e.g., by DSPs 150 and/or SSPs 170.

To protect user privacy, a user's group membership can be maintained at the user's client device 110, e.g., by one of the applications 112, the operating system of the client device 110, or another trusted program rather than by a digital component provider, content platform, or other party. In a particular example, a trusted program (e.g., a web browser or the operating system) can maintain a list of user group identifiers ("user group list") for a user using the web browser or another application (e.g., for a user logged into the browser, application, or the client device 110). The user group list can include a user group identifier for each user group that includes the user as a member. The digital component providers 160 or content platforms that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 displays a resource (e.g., web page), application content, or digital component related to a digital component provider 160, the resource, application content, or digital component can request that the application 112 add one or more user group identifiers to the user group list. In response, the application 112 can add the one or more user group identifiers to the user group list and store the user group list securely. For example, a web page at which a user selects to view more information about a particular item can add the user to a user group related to the particular item.

In some implementations, the MPC cluster 130 can use the user group membership of a user to select digital components that may be of interest to the user or may be beneficial to the user/user device in another way. For example, such digital components or other content may include data that improves a user experience, improves the running of a user device, or benefits the user or client device 110 in some other way. However, the user group identifiers of the user group list of a user can be provided and used to select digital components in ways that prevent the computing systems MPC1 and MPC2 of the MPC cluster 130 from accessing the user group identifiers for the user in cleartext, thereby preserving user privacy when using user group membership data to select digital components. The MPC cluster 130 can also use other conditions to select digital components, as described in more detail below: Cleartext is text that is not computationally tagged, specially formatted, or written in code, or data, including binary files, in a form that can be viewed or used without requiring a key or other decryption device, or other decryption process.

The example secure MPC cluster 130 includes two computing systems MPC1 and MPC2 that perform secure MPC processes to select digital components for distribution to client devices of users, e.g., based on the user's group membership and/or contextual data (e.g., contextual properties of an environment in which a selected digital component will be displayed), but without accessing the group membership, contextual data, or other user information, or signals derived from such user information, in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes. Each computing system MPC1 and MPC2 can be a server or other appropriate type of computer.

The computing systems MPC1 and MPC2 can be operated by different entities. In this way, each entity may not have access to the users' group membership, or other user information, or signals derived from such user information, in cleartext. For example, one of the computing systems MPC1 or MPC2 can be operated by a trusted party different from the users, the publishers 140, the DSPs 150, the SSPs 170, and the digital component providers 160. For example, an industry group, governmental group, or browser developer can maintain and operate one of the computing systems MPC1 and MPC2. The other computing system can be operated by a different one of these groups, such that a different trusted party operates each computing system MPC1 and MPC2. Advantageously, the different parties operating the different computing systems MPC1 and MPC2 may have no incentive to collude to endanger user privacy. In some implementations, the computing systems MPC1 and MPC2 are separated architecturally and are monitored to not communicate with each other outside of performing the secure MPC processes described in this document.

Each computing system MPC1 and MPC2 can store digital components (e.g., the creatives for the digital components), selection values for digital components, and other information for digital components. For example, the computing systems MPC1 and MPC2 can cache selection values previously received from SSPs 170 and/or DSPs 150 as part of previous digital component selection processes or that are otherwise provided to the computing systems MPC1 and MPC2, e.g., that are provided in advance for use in digital component selection processes. In this way, the MPC cluster 130 can use the selection values to select digital components for distribution to client devices 110 in response to future digital component requests received from client devices 110.

A digital component for which a selection value and other information is stored by the MPC cluster 130 for digital component selection processes can be referred to as a stored digital component in this document. However, the digital component itself is not necessarily stored by the MPC cluster 130. Instead, the MPC cluster 130 can store data, e.g., code that references a network location from which the digital component can be downloaded, for each stored digital component. In some implementations, the digital component itself is stored, and is returned to the application 112 directly, by the MPC cluster 130. Such implementation reduces the need for application 112 to fetch the digital components, and/or other information for digital components, in additional requests that may consume battery and bandwidth of the device, and may leak additional signals for the server hosting the digital component itself to track the device.

For each stored digital component, each computing system MPC1 and MPC2 can store a selection value or a vector of values that can be used by the computing systems MPC1 and MPC2 to determine a selection value for the digital component. A selection value for a digital component can be based on the context in which the digital component will be displayed. For example, a digital component provider 160 may be willing to provide a higher selection value for its digital component to be displayed on resources related to a particular topic (e.g., a web page related to travel) than for other topics, e.g., if the digital component is related to the particular topic. As another example, a digital component provider 160 may be willing to provide a higher selection value for its digital component to be displayed to users who have certain characteristics, interests, intentions, previous interactions with digital components, etc. Thus, a DSP 150 can provide, to the computing systems MPC1 and MPC2, multiple selection values (or multiple selection value vectors) for a given digital component, with each selection value or vector being for different combinations of contextual and user properties.

Each selection value or vector and its corresponding digital component can be referred to as a digital component selection item. A digital component selection item can include the digital component itself, the selection value or vector, the information for the digital component (e.g., the metadata for the digital component), an eligibility expression that defines a relationship between a set of eligibility criteria, and/or condition data.

The eligibility expression is used to determine whether the digital component selection item is eligible for distribution to a client device 110 based on the context in which the digital component would be displayed at the client device 110. The eligibility criteria is the criteria for the eligibility expression. The eligibility expression can be in the form of a Boolean expression that includes multiple sub-expressions and Boolean operators between the sub-expressions. An example eligibility expression can be: URL=example.com AND location=United States. A DSP 150 can provide, to the computing systems MPC1 and MPC, the eligibility expression for a digital component and corresponding selection value (or data, such as one or more vectors, that can be used to determine a selection value), e.g., as part of the digital component selection item. Example eligibility expressions, eligibility criteria, and techniques for evaluating the eligibility expressions are described below.

The condition data for a digital component selection item defines condition(s) that must be met for the digital component selection item (and therefore the digital component and selection value of the selection item) to be a candidate for a given digital component selection process. A stored digital component can have zero or more corresponding conditions. In some implementations, to be a candidate for selection, the digital component selection item has to be eligible based on the eligibility criteria for the digital component and each condition for the digital component selection item has to be satisfied.

One example condition is that the user to which a selected digital component will be provided is a member of a user group corresponding to the stored digital component. This condition can be referred to as a user group membership condition. In this example, the computing systems MPC1 and MPC2 can store, for a digital component selection item (e.g., as part of the selection item), a set of one or more user group identifiers that correspond to the digital component. These user group identifiers identify the user groups for which the stored digital component can be provided. That is, the digital component selection item is only a candidate for a digital component selection process that is performed to select a digital component to provide to a user that is a member of at least one of the user groups identified by the set of one or more user group identifiers for the digital component selection item.

Another example condition for a stored digital component is a frequency cap condition that indicates that the digital component, or digital components of a particular category, can only be provided to the same user a maximum number of times over a given time duration. Another example condition for a digital component is a blocked digital component condition that indicates that the digital component has been blocked, e.g., muted, by a user. For these example conditions, the computing systems MPC1 and MPC2 can receive and store, for each of multiple users, a probabilistic data structure, e.g., a cuckoo filter or Bloom filter, that represents digital components that cannot be provided to the user. For example, the probabilistic data structure can represent universal identifiers for digital components that are blocked either by the user directly or due to the frequency at which the digital component is displayed to the user being exceeded during the given time duration.

The computing systems MPC1 and MPC2 can receive the probabilistic data structures from the client devices 110 of the users, e.g., in an encrypted form that prevents either computing system MPC1 or MPC2 from accessing the identifiers in cleartext. For example, the application 112 running on a user's client device 110 can generate a Bloom filter that represents the identifiers for the blocked digital components that are blocked due to frequency capping or blocked by the user. The application 112 can then provide data to each computing system MPC1 and MPC2 that enable the computing systems MPC1 and MPC2 to collaboratively query the Bloom filter using a secure MPC process to determine whether a given digital component is blocked for the user. The computing systems MPC1 and MPC2 calculate secret shares of a blocked digital component condition using this secure MPC process.

In some implementations, the identifiers for the blocked digital components can be included in the same probabilistic data structure as the user group identifiers and queried using either the same or different sets of hash functions. However, the target false positive rate for the blocked digital components can be lower than the false positive rate for the user group identifiers. Thus, fewer hash functions can be used to generate and query a Bloom filter for blocked digital components than for user group identifiers. To reduce the data size of the Bloom filter for the blocked digital components, the user group identifiers can be represented by a different Bloom filter than the blocked digital components. This reduces latency in sending the Bloom filters over a network, reduces consumed bandwidth in sending the Bloom filters, and reduces battery power usage to send the Bloom filters.

Another example condition for a stored digital component is a pacing condition that paces the distribution of the digital component over a time duration. The computing systems MPC1 and MPC2 can store data that indicates the total number of times the digital component can be provided over a time duration and/or a maximum budget for the digital component for the time duration. The computing systems MPC1 and MPC2 can use this information to pace how often the digital component can be a candidate for digital component selection processes based on this condition (e.g., all conditions for the digital component would have to be satisfied for the digital component to be a candidate). In some implementations, the computing systems MPC1 and MPC2 can implement a feedback controller, e.g., a proportional-integral-derivative (PID) controller using secret shares to pace stored digital components that have a pacing condition.

In this example, the computing systems MPC1 and MPC2 can store the setpoint for the PID controller for a digital component and maintain the measured variable for the PID controller for the digital component. In general, a PID controller is a feedback controller that uses an error value, which is a difference between a target setpoint and a measured variable, to determine an output that drives the measured variable towards the setpoint. In the context of pacing the distribution of digital components to client devices, the setpoint for a campaign can be an impression rate, an interaction rate, a conversion rate, and/or a resource depletion rate (e.g., a budget spend rate). Similarly, the measured variable can be an impression rate, an interaction rate, a conversion rate, and/or a resource depletion rate over a given time duration. The computing systems MPC1 and MPC2 can also store the tuning parameters for each PID controller. The setpoint, measured variable, and tuning parameters can be stored in secret shares (with each computing system MPC1 and MPC2 storing a corresponding share of each parameter) or in cleartext depending on the target privacy/data security.

Another example condition is a k-anonymity condition. A k-anonymity condition can include a k-anonymity rule that requires that a digital component be eligible (or would have been selected) for distribution to at least k users over a given duration of time. The concept of k-anonymity ensures that data for a particular user is not distinguishable from the data of a threshold number k of other users. The system can enforce a k-anonymity rule, for example, by ensuring that a particular digital component is distributed to a client device 110 in response to a request for one or more digital components, and the same digital component could have been, or was, displayed to a set of at least k users or by at least k applications 112 within a particular period of time. In some implementations, each of the k applications 112 to which the digital component could have been, or was distributed must be for a different user. In this example, the computing systems MPC1 and MPC2 can store, for a digital component, the value k and maintain a number of users to which the digital component could have been distributed.

To determine the number of users that a digital component could have been displayed can include executing a counterfactual digital component selection process in parallel with each actual digital component selection process. In this counterfactual digital component selection process, all digital components can be candidates if they satisfy all conditions other than the k-anonymity condition. If the digital component is selected for at least k users or applications 112 in the counterfactual digital component selection processes, the digital component would have been displayed to k users if not for the k-anonymity condition. Once this happens, the digital component satisfies the k-anonymity condition can be included in the actual digital component selection processes (assuming the other conditions, if any, for the digital component are satisfied), which does not include digital components that have an unsatisfied k-anonymity condition.

In some implementations, each digital component selection item is stored in the form of a digital component information element dc_information_element, which can be a byte array having the selection value and other information for the digital component, e.g., including the creative itself. The byte array can have a particular format that applications 112 or trusted programs of client devices 110, and the computing systems MPC1 and MPC2 can parse to obtain the selection value and metadata. In some implementations, the digital component information element can include the digital component itself.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, postal code, or state level), so that a particular location of a user cannot be determined. Thus, the user may have control over what information is collected about the user, how that information is used, and what information is provided to the user.

In this document, some computations performed over secret shares by the MPC cluster are shown as being products or sums of secret share values. To increase the speed at which these computations are performed, multiplications can be performed in secret shares using AND operations, e.g., bitwise-AND, and additions can be performed in secret shares using XOR operations, e.g., bitwise-XOR operations. In some cases, when one cleartext integer is multiplied by a secret share representing zero or one in Z2 (i.e., the sum of the two shares modulo 2 is either zero or one), no multiplication or bitwise-AND is needed. Instead, each computing system can evaluate its share and return the integer if its share is one and zero if its share is zero.

Figure 2:
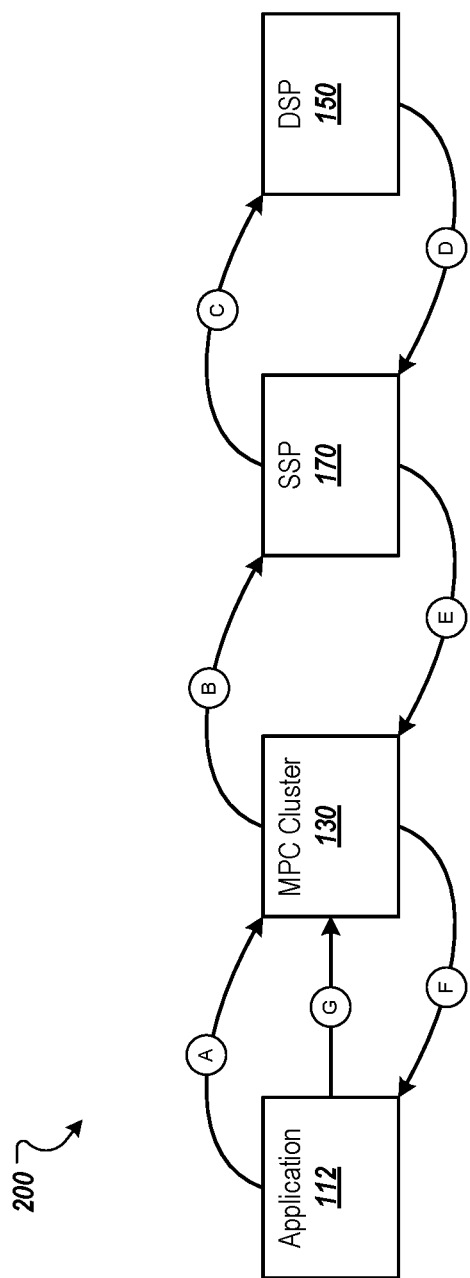
FIG. 2 shows an example data flow within the environment of FIG. 1.

FIG. 2 shows an example data flow within the environment 100 of FIG. 1. This description includes two types of selection values: selection values that are conditioned on either sensitive user information, such as user group membership or other business sensitive information, or parameters whose changes in value can allow unscrupulous parties to infer the sensitive information, or "conditional selection values": and selection values that are not conditioned on sensitive information, or "unconditional selection values." To protect user privacy, the conditions for "conditional selection values" are evaluated within MPC cluster 130 instead of SSP 170 or DSP 150 to determine whether "conditional selection values" are candidates for the digital component selection process.

This structure allows the MPC cluster 130 to protect user privacy and business confidential information, and to prove its trustworthiness to application providers, such as a provider of application 112. In this example, the MPC cluster 130 relies on secure 2-Party computation (2PC) architecture, which applies cryptography techniques to guarantee that, if at least one of the two computing systems of the MPC cluster 130 is honest, there is no leaking of confidential user data or business confidential information. If the MPC cluster 130 includes more than two computing systems, the current MPC protocol can be expanded, or other MPC protocols can be used.

The MPC cluster 130 runs the secure 2PC protocol to evaluate and apply conditions to evaluate the eligibility of candidate digital components, conduct selection processes to select a digital component based on selection values, and to receive impression and user interaction (e.g., digital component selection) notifications to update parameters on which those conditions depend. All of these processes can be done using the secure 2PC and secret sharing techniques. This protocol is described in detail with reference to FIGS. 3-6.

In stage A, an application 112, e.g., in collaboration with a triggering element from a content platform, such as SSP 170, sends a request for a digital component to the MPC cluster 130. The application 112 can include multiple requests for digital components together into one combination request to fetch multiple digital components. The MPC cluster 130 can then serve each request in the combination request independently, or make one or more selection decisions holistically. In this example, the request is for a single digital component, and includes a request for a digital component that is selected based on sensitive information or a digital component that is selected without using sensitive information. The MPC cluster 130 can respond to the request by selecting a particular digital component corresponding to a particular selection value from among a set of selection values that are each mapped to a respective particular digital component. These selection values can be selections values that were previously cached, or otherwise stored, at the MPC cluster 130 and/or selection values generated by a platform, such as DSP 150 or SSP 170, just-in-time (JIT) selection values. JIT selection values are generated directly in response to need, and increase efficiency and decrease waste, because the selection values are only generated when a digital component is needed. For example, JIT selection values can be generated when a digital component slot becomes available—this is indicated by the receipt of a request for a digital component. Thus, the MPC cluster 130 can select a digital component from a set of digital components that include stored digital components for which information is stored at the MPC cluster 130 and digital components for which JIT selection values are received for the current digital component request.

In some implementations, the selection value for a digital component can be determined using two or more vectors. The MPC cluster 130 can store, for a digital component, a first vector of values that can be used to determine a selection value for the digital component. The first vector of values can be used to determine a selection value for the digital component when a digital component is being selected. Thus, the first vector of values can also be referred to as a digital component-based vector. The digital component-based vector can include multiple elements across two or more dimensions and each element can represent a particular feature of a digital component presentation opportunity. For example, the digital component-based vector of values can include elements for geographic locations or regions associated with the digital component, spoken languages, ages or age ranges to which the digital component is relevant, particular URLs of web pages or other electronic resources, particular products or services, whether a digital component will perform well when it is displayed above or below the fold, the type of digital component, the size of the digital component, the time of day when the digital component is most appropriate to be displayed, and/or other appropriate features of the digital component. In some implementations, e.g., implementations that adopt neural networks, the digital component-based vector of values can be an embedding of user group and other user and/or digital component signals in some abstract vector space.

The value of each element can reflect an amount to increase or decrease a selection value for the digital component based on a current digital component presentation opportunity having the feature corresponding to the element. For example, if a DSP 150 wants the digital component to be displayed to users in Atlanta, but not users in Dallas, the value for an element for Atlanta can be a positive value above a value of one, and the value for an element for Dallas can be a positive value below one, e.g., zero, or a negative value. As described in more detail below; the values of the digital component-based vector can be part of a vector dot product computation to determine a selection value for the digital component.

The request contains information used in a digital component selection process, including information that can be sensitive, such as user group identifiers for user groups to which the application 112 is mapped or otherwise associated, and information that is not sensitive, such as contextual signals (e.g., contextual properties of an environment in which a selected digital component will be displayed) from the application 112 regarding the context in which the digital component will be presented and/or displayed. As described in further detail below; the design of system 110 improves the protection of user data that can be sensitive or confidential.

The triggering element can be, for example, a tag that detects the presence of a digital component slot within an internet location visited by application 112. The triggering element can be placed, for example, at the Internet location and can inform the application 112 of the presence of a digital component slot for which a digital component should be requested.

In stage B, the MPC cluster 130 transmits a digital component request that is based on information that is not sensitive, such as contextual signals, to SSP 170. This request is referred to as a "contextual request." The contextual request can contain various contextual signals and non-sensitive user information gathered directly by the Internet location (e.g., a content publisher) that triggered the request for a digital component. For example, the contextual signals can include analytics data, language settings, and other data that assist the content publisher with providing a good user experience. The contextual request provided to SSP 170 does not, however, include sensitive information, such as user group identifiers.

In stage C, the SSP 170 forwards the contextual request to one or more DSPs 150. In this particular example, and for simplicity, the SSP 170 forwards the contextual request to a single DSP 150. For example, SSP 170 can forward the contextual request to DSP 150. In this example, DSP 150 has digital components and selection values mapped to the digital components, or can determine a selection value for a digital component using the contextual signals.

In stage D, the one or more DSPs 150 return selection values in response to the contextual request. For example, DSP 150 returns one or more selection values mapped to digital components responsive to the contextual request. The DSP 150 can return the selection values in the form of digital component selection items that include the selection value, additional information for the digital component, and optionally the digital component itself, e.g., in the form of a creative. DSP 150 can return any number of selection values responsive to the contextual request.

In some implementations, DSP 150 can additionally return selection values responsive to a digital component request based on sensitive information, such as user group information. These selection values are "conditional selection values" because they are conditioned on sensitive information, and thus are conditioned on the MPC cluster 130 receiving a request that includes sensitive information matching the sensitive information on which the selection values are conditioned. For each selection value that DSP 150 provides, DSP 150 optionally includes information such as a time-to-live (TTL) parameter, i.e. the maximum timespan that the MPC cluster 130 may cache or otherwise store the selection value, e.g., store the digital component selection item. This TTL parameter enables the MPC cluster 130 to cache selection values received from DSP 150. In some implementations, without a TTL parameter, the MPC cluster 130 does not cache received selection values, and instead will discard the selection values after the selection values have been used in a selection process, e.g., in the selection process corresponding to the digital component request transmitted in stages A, B and C. If the digital component selection item is stored by the MPC cluster 130, the MPC cluster 130 can include the digital component selection item in future digital component selection processes for future digital component requests received from client devices.

The DSP 150 can also provide, e.g., as part of a digital component selection item, an eligibility expression and its corresponding eligibility criteria, and condition data that defines any condition(s) that must be met for the digital component selection item to be a candidate for selection. This information can be provided in cleartext or in shares, e.g., secret shares, depending on the target level of privacy protection and/or target level of data security. If secret shares are used, the DSP 150 can provide, to the SSP 170, a first secret share of the eligibility expression, a first secret share of the eligibility criteria, and a first secret share of the condition data for each condition. The DSP 150 can also provide, to the SSP 170, a second secret share of the eligibility expression, a second secret share of the eligibility criteria, and a second secret share of the condition data for each condition. The SSP 170 can provide the first secret shares to MPC1 and the second secret shares to MPC2 such that neither MPC1 nor MPC2 has access to either piece of information in cleartext absent unauthorized collusion.

When vectors are used to determine the selection value, the DSP 150 can generate and return a second vector of values. The DSP 150 can generate the second vector of values based on the contextual signals of the digital component request transmitted in stage B and C. The second vector can be referred to as a contextual vector. The contextual vector can include the same elements corresponding to the same features as the digital component-based vector. However, the DSP 150 can determine the values of the contextual vector for the current digital component request based on the contextual signals of the digital component request. In contrast, the values of the digital component-based vector of the DSP 150 is stored as the MPC cluster 130 and is determined ahead of time, e.g., based on the user group(s) corresponding to the digital component-based vector.

For each DSP 150 that provides a contextual vector, the MPC cluster 130 can determine the selection value for each stored digital component of the DSP 150 by determining a dot product of the digital component-based vector and the contextual vector provided by the DSP 150. If the DSP 150 has multiple digital component-based vectors stored by the MPC cluster 130, e.g., each for a different digital component, the MPC cluster 130 determine, for each digital component-based vector, the dot product of the contextual vector and the digital component-based vector.

In some implementations, a third vector can be used based on a user profile of the user for which the digital component request is submitted. This vector can have the same dimensions and features as the other vectors, but with values based on a user profile for the user.

For example, the value for a location element for Austin in the user profile vector can have a positive value if the user is in Austin or a negative value or value of zero if the user is not in Austin: the value for the same location element in the contextual vector can have a positive value if the publisher content currently shown to the user is highly relevant to Austin; the value for the same location element in the digital component-based vector for the digital component is positive if the digital component is relevant to Austin. To calculate the dot product of three vectors, the computing systems MPC1 and MPC2 first perform element-wise multiplication among corresponding elements, one from each of the three vectors, then sum the result. For example, assuming that the three vectors are $V_1 = \{v_{1,1} \ldots$ $V_{1,n}\}$, $V_2=\{v_{2,1} \ldots v_{2,n}\}$ and $V_3=\{v_{3,1} \ldots v_{3,n}\}$ respectively, the dot-product among the three vectors would be $\Sigma_{i=1}^{n} v_{1,i} \times v_{2,i} \times v_{3,i}$.

In stage E, the SSP 170 receives the digital component selection items from the DSP 150 and provides the digital component selection items to the MPC cluster 130. In some implementations, the SSP 170 can process the digital component selection items prior to sending the digital component selection items to the MPC cluster 130.

For example, SSP 170 can apply selection value rules to determine, for example, how selection values affect post-publishing values for particular content providers. Post-publishing values can indicate, for example, an amount that is provided to a publisher 140 for displaying the digital component with a resource or application content of the publisher 140. The SSP 170 then performs a selection process to determine a top unconditional selection value, the unconditional selection value that yields the highest post-publishing value. An unconditional selection value is not conditioned on sensitive information, and therefore content selection rules such as budget and pacing rules, advertiser and digital component exclusion can be applied by the SSP 170 (or DSP 150) rather than by the MPC cluster 130. The SSP 170 then forwards the following, which are JIT selection values, to the MPC cluster 130: all selection values that enable caching in the MPC cluster 130 (selection values having TTL values) and all selection values whose post-publishing value is no less than the post-publishing value of the top unconditional selection value.

In some implementations, the DSP 150 and/or SSP 170 can infer properties of the environment in which a selected digital component request will be displayed. For example, the DSP 150 and/or SSP 170 can infer the coarse location of the client device 110 at which the digital component will be displayed, the topic of the resource with which the digital component will be displayed, the time of day and/or date that the digital component will be displayed, etc. The SSP 170 can provide the inferred properties to the MPC cluster 130 along with the digital component selection items. In some implementations, MPC cluster 130 can infer the coarse location of the client device 110 at which the digital component will be displayed, based on information not available (such as client device IP address) at DSP 150 and SSP 170.

In stage F, the MPC cluster 130 updates its cache with JIT selection values received that enable caching (i.e., have TTL values). In addition, the MPC cluster 130 applies selection rules, such as user group membership rules, frequency control, pacing rules, and rules to prevent micro-targeting of a particular user to all selection values received in stage E, as well as to previously cached selection values to select valid candidates for the selection process. The rules can include restrictions and guidelines on the manner or frequency of distribution of a digital component, among other factors. The rules include frequency control, muting, resource depletion, and pacing constraints. In some implementations, the JIT digital components that have conditions that are evaluated by the MPC cluster 130 can be ignored for the current digital component selection process. For example, ignoring these digital components for the current selection process can provide performance benefits, e.g., reduced latency in selecting and providing a digital component. The MPC cluster 130 then runs the final selection process among all eligible candidates, selects a winning digital component, and then returns data for selected digital component to the application 112 in response to the digital component request. The application of the rules and selection of the digital component can be performed using a secure MPC process using secret shares, as described with reference to FIGS. 3-6.

In stage G, the selected digital component is rendered by application 112. Application 112 then provides an impression notification to the MPC cluster 130. This impression notification includes data that allows the MPC cluster 130 to update information relevant to updating parameters that allow the MPC cluster 130 to enforce selection rules for future digital component requests, e.g., received in subsequent occurrences of stage A. In some implementations, application 112 may provide an interaction notification to the MPC cluster 130 when the user interacts with the digital component, such as clicking on the digital component. In some implementations, application 112 may send the impression or interaction notification G to MPC cluster 130 by piggy-back on top of a future component request A to reduce the number of network communications and battery/bandwidth consumption for mobile devices, as well as processing/computational costs for the MPC cluster 130.

Figure 3:
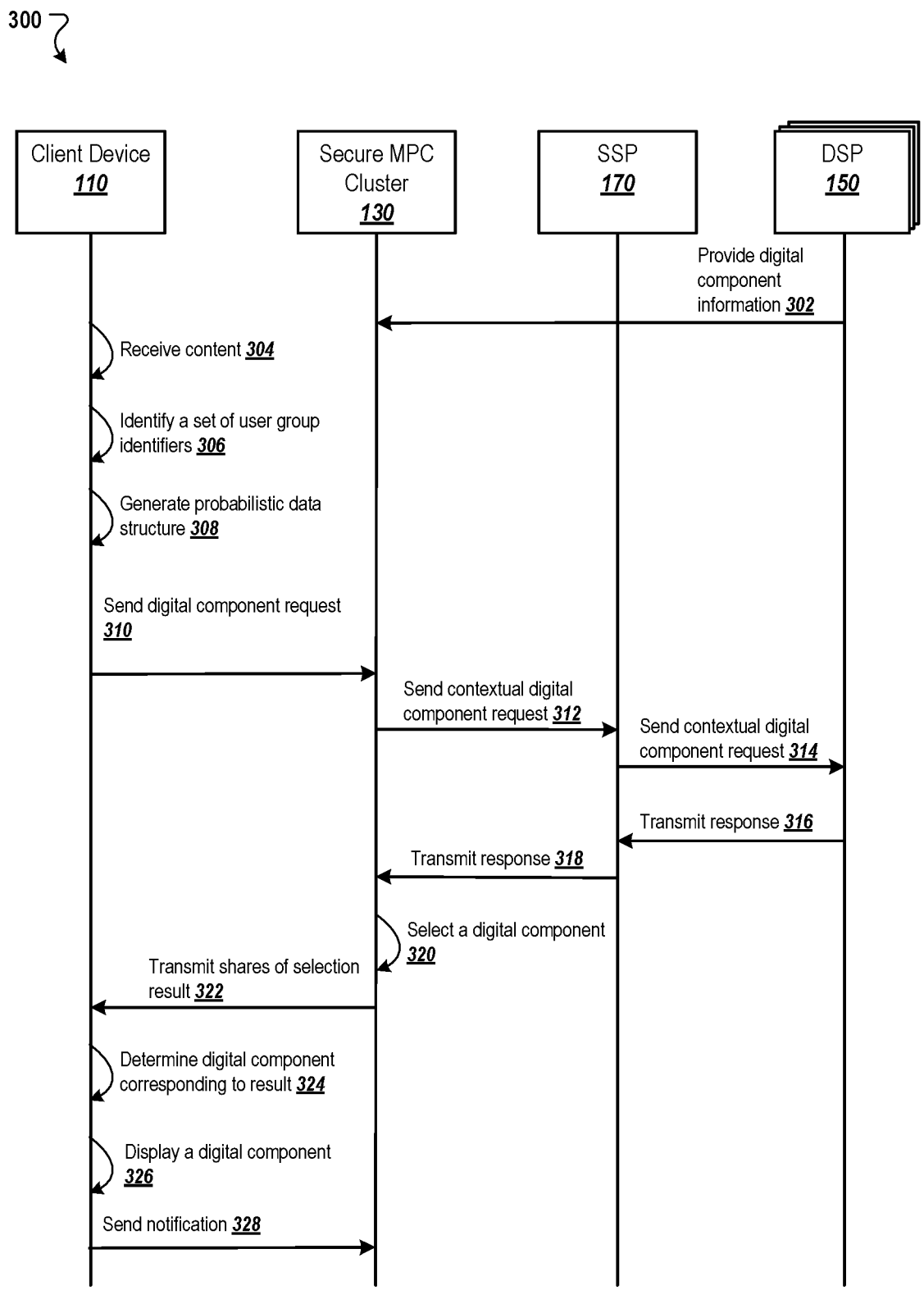
FIG. 3 is a diagram of an example process for selecting a digital component for distribution to a client device.

FIG. 3 is a swim lane diagram of an example process 300 for selecting a digital component for distribution to a client device. Operations of the process 300 can be implemented, for example, by the client device 110, the computing systems MPC1 and MPC2 of the MPC cluster 130, and DSPs 150. Operations of the process 300 can also be implemented as instructions stored on one or more computer readable media which may be non-transitory, and execution of the instructions by one or more data processing apparatus can cause the one or more data processing apparatus to perform the operations of the process 300. Although the process 300 and other processes below are described in terms of a two computing system MPC cluster 130, MPC clusters having more than two computing systems can also be used to perform similar processes. In addition, operations of the process 300 can be implemented by SSPs 170.

The DSPs 150 provide information for digital components (302). This information can include selection values and additional information (e.g., eligibility expressions, eligibility criteria, and/or condition data for conditions) for the digital components. In some implementations, the DSPs 150 provide the selection values and additional information to the MPC cluster 130 via the SSP (not shown in FIG. 3 for brevity). For example, the DSPs 150 can provide the selection values and additional information in response to digital component requests and designate the digital components corresponding to the selection values as stored digital components that should be stored at the MPC cluster 130.

As described above, a DSP 150 can provide one or more digital component selection items for one or more digital components to the MPC cluster 130. Each digital component selection item can have a corresponding digital component, a selection value, and the other information described above. To provide different selection values for different contextual environments, the DSP 150 can provide multiple digital component selection items for the same digital component, where each digital component selection item can have a different eligibility expression or different eligibility criteria and different selection values. The MPC cluster 130 can store, e.g., in high speed memory, such as a cache, the digital component selection items for future digital component requests received from client devices 110.

In some implementations, a DSP 150 can provide a digital component-based vector of values for a digital component instead of a static selection value for the digital component. In such examples, the digital component-based vector of values can be stored in place of the selection value.

The client device 110 receives content (304). For example, the client device 110 can receive an electronic resource (e.g., web page) for display by a web browser or application content for display by a native application. The content can include one or more digital component slots that include computer-readable code, e.g., scripts, that, when executed, cause the client device 110 to request a digital component for each slot. The client device 110 can render the content on a display of the client device 110.

The client device 110 identifies a set of user group identifiers (306). The set of user group identifiers can be the user group identifiers for the user groups that include the user of the application 112 or client device 110 as a member. For example, the set of user group identifiers can be the user group identifiers in the user group list. The application 112 that renders the content or a trusted program can identify the set of user group identifiers, e.g., by accessing the user group list from secure storage of the client device 110.

The client device 110 generates a probabilistic data structure (308). To securely and efficiently generate a digital component request based on sensitive information, the application 112 can use probabilistic data structures, such as a cuckoo filter or a Bloom filter. In this example, the probabilistic data structure is a cuckoo filter. An example of using a Bloom filter is described with reference to FIG. 8. In general, a cuckoo filter includes an array of buckets where each bucket can hold b fingerprints. The fingerprint of an item is a bit string derived from the hash of that item. A cuckoo filter uses n hash functions that allows an item to be placed in n different buckets in any of the b positions. Typically, a cuckoo filter is identified by the number of fingerprints in each bucket and the number of buckets. For example, a (2, 4) cuckoo filter has 2 buckets and each bucket in the cuckoo array can store up to 4 fingerprints. Therefore, the total capacity of the cuckoo filter is 2×4 or 8 fingerprints.

Depending on the configuration of the cuckoo filter, an item can be inserted into a cuckoo filter in one of N possible locations, e.g. N=2. The application 112 uses N pseudo random functions (PRF) parameterized by a user group identifier or an identifier from the set of blocked identifiers and either of two random variables generated by the application 112 to determine all possible locations for the item to be inserted. For example, assume that the two random variables generated by the application 112 are rand_var1a and rand_var1b. In some implementations, the application 112 and the MPC cluster 130 agree on a PRF in advance, where PRF(x, y)∈[0, $2^k-1$] where k is the number of bits in each item in a bucket of the cuckoo filter.

Each location of the cuckoo filter can be occupied by a user group identifier or a blocked identifier, or empty. The blocked identifiers are identifiers for which the application 112 is blocking digital components, e.g., based on frequency controls or for which the user selected to block digital components for the user group. The application 112 can generate a cuckoo filter table whose elements are PRF (ug_id, rand_var1a), PRF(blocked_uid, rand_var1b), and 0, where ug_id is the identifier of the user group generated by applying HMAC on the label of the user group based on the domain of the content provider, blocked_uid is an identifier from a set of blocked identifiers, and 0 represents an empty item. The process is repeated on all user group identifiers. In some implementations, the same probabilistic data structure, e.g., cuckoo filter or Bloom filter, can store both user group identifiers and blocked identifiers. In other implementations, user group identifiers and blocked identifiers are stored in dedicated probabilistic data structures.

The application 112 can generate a vector B based on a cuckoo filter table generated for the user group identifiers and/or blocked identifiers. Each value B, in the vector B can be represented as $B_i=(A_i-PRF(rand\_var2, i))$ mod p where A is the cuckoo filter table and i is the index of the vector B and cuckoo filter table A. When the application 112 initiates a request for a digital component for a digital component slot, the application 112 transmits rand_var1a, rand_var1b and rand_var2 as parameters of the request to computing system MPC1. The application 112 also transmits the vector B, rand_var_1a and rand_var_1b as parameters of the request to computing system MPC2. PRF(rand_var2, i) and $B_i$ are two additive secret shares of $A_i$ in $Z_p$, held by computing systems MPC1 and MPC2 respectively. Because neither of the computing systems MPC1 and MPC2 have access to both the secret shares, neither of the computing systems can recreate the cuckoo filter table, preserving user privacy.

Steps 306 and 308 are optional steps that can be excluded in some implementations. For example, the MPC cluster 130 can provide digital components without considering the user group membership of the user. In implementations in which use group membership is used, the client device 110 can encrypt and/or compress the user group membership data in different ways than using a probabilistic data structure.

The client device 110 transmits, to the MPC cluster 130, a digital component request (310). The digital component request can include contextual data related to the context in which a selected digital component will be displayed, e.g., contextual properties of an environment in which a selected digital component will be displayed. The contextual data can include data about the resource with which the digital component will be displayed, data about the user of the client device 110, data about the application 112 that will display the digital component, data about the client device 110, and/or general contextual data (e.g., date and time of day).

The data about the resource can include the URL of the resource, the topic of the resource, the number of digital component slots of the resource, the types of digital component slots, the location(s) within the resource of the digital component slots, etc. The data about the user can include demographic data (e.g., age, gender, etc.), user group membership, and/or other appropriate user data. The data about the application 112 can include the name of the application (e.g., a particular web browser or native application), the category of application (e.g., browser, video streaming application, maps application, etc.), and/or other appropriate data about the application 112. The data about the client device 110 can include coarse geographic location information that indicates a general area of the client device 110 (e.g., city, state, postal code, etc.), the type of client device 110, the size of the client device's display, etc.

As some or all of the contextual and/or user data can be considered private, the client device 110 can transmit the data using encryption or other techniques to prevent any unauthorized entity from obtaining such information. To prevent these entities and the computing systems MPC1 and MPC2 of the MPC cluster 130 from accessing the contextual data in cleartext, the client device 110 can generate respective shares, e.g., secret shares, of the contextual data and send a share to each computing system of the MPC cluster 130. For example, the client device 110 can send a first secret share of the contextual data to computing system MPC1 and a second secret share of the contextual data to computing system MPC2. In this way, absent unauthorized collusion, neither computing system MPC1 nor MPC2 can reconstruct the contextual data in cleartext.

In some implementations, the application 112 can be configured to send some of the contextual data, e.g., the contextual data considered sensitive, using secret shares, while sending some of the contextual data in cleartext or encrypted using encryption techniques that enable the computing systems MPC1 and MPC2 to access the contextual data in plaintext. This enables the MPC cluster 130 to send at least some contextual data to the SSP 170 for distribution to the DSPs 150, such that the DSPs 150 can use this contextual data to select digital components and/or selection values for the digital components. In some implementations, the client device 110 or the application 112 generates the contextual digital component request, encrypts it into a blob using the SSP 170's public key, and inserts the blob into the digital component request as a parameter. In such implementations, MPC Cluster 130 can forward the contextual data intended for the SSP 170 as an encrypted blob, without accessing the contextual data in cleartext.

In implementations that include probabilistic data structures for representing user group membership, the digital component request can include the parameters for the cuckoo filter. For example, the client device 110 can transmit, to computing system MPC1, a digital component request that includes rand_var1a, rand_var1b and rand_var2. The client device 110 can also transmit, to computing system MPC2, a digital component request that includes vector B, rand_var1a and rand_var1b. Both digital component requests can also include contextual signals, e.g., the URL of the electronic resource, the number of digital component slots of the resource, the geographic location of the client device 110, and/or other appropriate contextual signals, e.g., lookup key, that can be used to select a digital component.

The MPC cluster 130 transmits a contextual digital component request to the SSP 170 (312). This digital component request can include the contextual signals, but not sensitive user data, such as user group identifiers that identify user groups that include the user as a member. For example, the contextual digital component request can include the cleartext contextual data received from the client device 110, but not any contextual data that was sent from the client device 110 as secret shares. In some implementations, the contextual digital component request was generated by the SSP's tags on the publisher's page rendered on client device 110, or by the SSP's software development kit (SDK) on the publisher's applications installed on client device 110.

The SSP 170 transmits the contextual digital component request to one or more DSPs 150 (314). Each DSP 150 can respond to a request with one or more conditional selection values for digital components and/or one or more unconditional selection values for digital components. For each digital component, the response can include data identifying the digital component, the selection value for the digital component, and metadata (or other additional information) for the digital component. For example, the response can include a digital component selection item, e.g., a digital component information element dc_information_element, for each digital component. Each DSP 150 can select one or more digital components for inclusion in the digital component selection process based on the contextual signals and determine or identify a selection value for each selected digital component. In some implementations, a DSP 150 can generate a contextual vector for each of one or more digital components based on the contextual signals.

Each DSP 150 can transmit its response to the SSP 170 (316). The SSP 170 can transmit the responses to the MPC cluster 130 (318). As described above, the DSPs 150 and/or SSP 170 can infer additional contextual data for the environment in which the selected digital component will be displayed at the client device 110, e.g., based on the contextual data received from the MPC cluster 130. If so, the SSP 170 can also include this additional contextual data in the response to the MPC cluster 130.

The MPC cluster 130 performs a secure MPC process to select a digital component to provide for display at the client device 110 (320). This selection can include identifying a set of digital components and their corresponding selection values, e.g., identifying digital component selection items, that are eligible for the digital component selection process based on contextual signals, e.g., using an eligibility expression and/or eligibility criteria. This can also include identifying, from the set of eligible digital component selection items, candidate digital component selection items that are candidates for selection. The candidate digital component selection items can include the unconditional digital components for which the DSPs 150 provided unconditional selection values or vectors and conditional digital components for which each condition of the digital component is satisfied. A conditional digital component selection item is only considered a candidate for a digital component selection process when all conditions of the digital component selection item are satisfied.

The MPC cluster 130 can select, from the candidate digital component items, a digital component selection item for which to provide its digital component to the client device 110 in response to the digital component request based on the selection values for the candidate digital component selection items. For digital component selection items having a selection value determined using vectors, the MPC cluster 130 can determine the selection value for the digital component selection item by determining a dot product of the vectors, e.g., the digital component-based vector, the contextual vector, and optionally a user profile vector.

The MPC cluster 130 transmits secret shares of a selection result to the client device 110 (322). In some implementations, the MPC cluster 130 can also send a selection process identifier for the digital component selection process to the client device 110. The selection process identifier can uniquely identify the digital component selection process for which the selection result was generated. For example, the computing systems MPC1 and MPC2 can each generate a respective selection process identifier SPID) for each digital component request for which the computing systems MPC1 and MPC2 perform a selection process to generate a selection result to provide to a client device 110. In some implementations, the selection process identifier SPID) can be a nonce or an opaque alphanumeric or numeric sequence.

By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster 130 by limiting the number of digital components for which information is provided to the client device.

The MPC cluster 130 can also store data for the selection values that were part of the selection process keyed by, or otherwise linked to, the SPIDs. For example, computing system MPC1 can store a table or other data structure that includes data for the selection values with a key that is based on the $SPID_1$ generated by computing system MPC1 for the selection process. Similarly, computing system MPC2 can store a table or other data structure that includes data for the selection values with a key that is based on the $SPID_2$ generated by computing system MPC2 for the selection process. This enables the MPC cluster 130 to update the process variables for the feedback controllers based on data received from the client device 110. In some implementations, the client device 110 or the application 112 generates the SPID. In some implementations, the MPC1 and MPC2 infer the SPID from the digital component request 310.

The selection result can be in the form of a byte array that includes information about the digital component of the selection digital component selection item. For example, the selection result can be a byte array that includes the selection value for the digital component and the metadata and/or other additional information for the digital component. The computing systems MPC1 and MPC2 can determine, using the secure MPC process, the secret shares of the selection result, as described in more detail below. The computing system MPC1 can transmit a first secret share of the selection result to the client device 110 and the computing system MPC2 can send a second secret share of the selection result to the client device 110. To prevent the computing systems MPC1 and MPC2 knowing the selected digital component, the computing systems MPC1 and MPC2 can be prevented from sharing their secret shares of the selection result with each other. For example, MPC1 and MPC2 can independently encrypt its respective secret shares with the client device's public key, which can be a parameter in the digital component request.

By sending secret shares of a result for only selected digital components rather than information for all or a large set of digital components similarly reduces latency and consumed bandwidth, processing power, and battery power in transmitting and receiving the result. This also reduces the potential leakage of confidential information of content platforms that submit selection values for digital components to the MPC cluster by limiting the number of digital components for which information is provided to the client device.

The client device 110 determines a digital component that corresponds to the selection result(s) (324). For each selection result for which the client device 110 receives two secret shares from the computing systems MPC1 and MPC2, the client device 110 can determine the selection result from the two secret shares. For example, using an additive secret share library as described in more detail below, the client device 110 can add the two secret shares of the selection result together to obtain the selection result in cleartext. This gives the client device 110 access to the selection value for the digital component and the metadata for the digital component, e.g., the identity of the digital component, the location from which the client device 110 can download the digital component, etc. In some implementations, the byte array includes the digital component itself such that the client device 110 can access the digital component after reconstructing the secret shares of the selection result.

The client device 110 displays the digital component (326). For example, the application 112 can display the digital component with the content received in step 304. In some implementations, the client device 110 can display the digital component of the selection result.

In some implementations, the client device 110 can request a digital component based on user group membership (or other user signals) from the MPC cluster 130. The client device 110 can also request digital components based on contextual signals from an SSP 170. These contextual signals can include the same contextual signals described above, and optionally additional contextual signals such as the number of digital component slots of the resource, the types of digital component slots, the types and/or format of digital components that can be displayed with the resource, etc. The SSP 170 can select one or more digital components based on the contextual signals and selection values for the digital components and provide one or more of the selected digital components (or data identifying the digital components) and the selection values for the digital component(s) to the client device 110. The client device 110 can then select, from a set of digital components that include the digital component of the selection result received from the MPC cluster 130 and the digital component(s) selected by the SSP 170, a digital component to display with the resource. If a resource includes multiple digital component slots, the client device 110 can request a respective digital component for each slot from the MPC cluster 130 and from the SSP 170.

The client device 110 can transmit one or more event notifications to the MPC cluster 130 (328). For example, assuming that a digital component of the selection result received from the MPC cluster 130 is displayed by the application 112 of the client device 110, the application 112 can transmit an impression notification for a digital component in response to displaying the digital component. In another example, the application 112 can transmit a user interaction notification in response to detecting user interaction, e.g., a selection/click of the digital component.

For user interaction notifications, the application 112 can generate secret shares of a clicked parameter clicked that is a Boolean parameter that can have a value of one if the user interacted with the digital component, or a value of zero if the user did not interact with the digital component within a specified duration of time after the digital component was displayed. Thus, in this example, either value indicates that the digital component was displayed, but a value of one can indicate that the user interacted with the digital component. The application 112 can send, to computer system MPC1, a first notification that includes the $SPID_1$ received from computing system MPC1 and a first secret share [$clicked_1$] of the clicked parameter. Similarly, the application 112 can send, to computer system MPC2, a second notification that includes the $SPID_2$ received from computing system MPC2 and a second secret share [$clicked_2$] of the clicked parameter. In another example, the notification can separately indicate whether the digital component was displayed at the client device 110, e.g., using secret shares similar to the clicked parameter.

The impression and user interaction notifications enable the MPC cluster 130 to update the process variables for a feedback controller used to pace the distribution of the digital component. For example, if the process variable is an impression rate, the MPC cluster 130 can use the impression notification to update a count of the impressions of the digital component (or campaign that includes the digital component). If the process variable is a user interaction rate, the MPC cluster 130 can use the clicked parameter to update a number of user interactions for the digital component (or campaign that includes the digital component). In a particular example, computing system MPC1 can use the $SPID_1$ to obtain the stored data for the selection process and computing system MPC2 can use the $SPID_2$ to obtain the stored data for the selection process. The MPC cluster 130 can then perform a secure MPC process to update the process variables (e.g., impression rate, interaction rate, conversion rate, and/or resource depletion rate) for the campaign of the digital component that was displayed by the application 112. Similarly, the MPC cluster 130 can use the notifications to update counts used to determine whether a digital component satisfies a k-anonymity condition.

Figure 4:
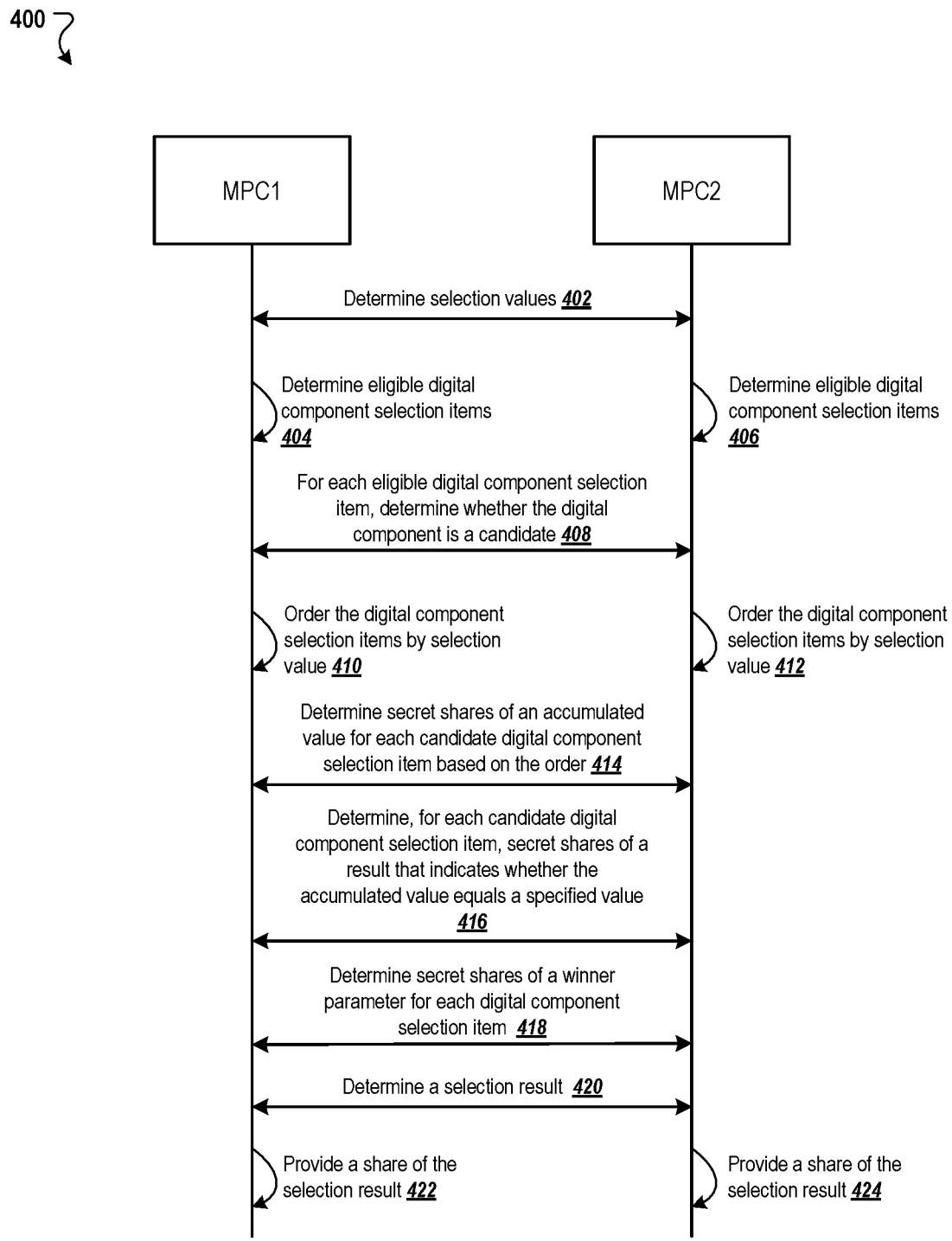
FIG. 4 is a diagram of an example process for selecting a digital component for distribution to a client device.

FIG. 4 is a swim lane diagram of an example process 400 for selecting a digital component for distribution to a client device. Operations of the process 400 can be implemented, for example, by the computing systems MPC1 and MPC2 of the MPC cluster 130. Operations of the process 400 can also be implemented as instructions stored on one or more computer readable media which may be non-transitory, and execution of the instructions by one or more data processing apparatus can cause the one or more data processing apparatus to perform the operations of the process 400.

The computing systems MPC1 and MPC2 determine, and/or identify, selection values for digital components (402). The computing systems MPC1 and MPC2 can determine the selection values in response to a digital component request received from a client device 110. As described with reference to FIG. 3, computing system MPC1 can receive, from the client device 110, a digital component request that includes contextual data and optionally data for a probabilistic data structure that represents user group identifiers for the user of the client device 110. The data for the probabilistic data structure can include parameters rand_var1a, rand_var1b and rand_var2. Similarly, computing system MPC2 can receive, from the client device 110, the contextual data and the parameters vector B, rand_var1a and rand_var1b. The contextual data can include contextual properties of an environment in which a selected digital component will be displayed, as described above.

The client device 110 can send the contextual data to the computing systems MPC1 and MPC2 in various ways. In some implementations, the client device 110 can send a first secret share of the contextual data to computing system MPC1 and a second secret share of the contextual data to computing system MPC2. If some contextual data is considered to be non-sensitive, the client device 110 can send this non-sensitive contextual data to each computing system MPC1 and MPC2 in cleartext.

In some implementations, the client device 110 can encode the contextual properties into a vector and send the vector to each computing system MPC1 and MPC2, or send respective secret shares of the vector to computing systems MPC1 and MPC2. The elements in the vector (and optionally when not in vector form) can be expressed as integers. For example, locations can be expressed as integers by assigning an integer to each possible location or using the postal code for the location.

The selection values can include selection values for stored digital components for which data is stored by each computing system MPC1 and MPC2 and JIT selection values received for the digital component selection process from an SSP 170. For situations in which the selection values are determined using vectors, each computing system MPC1 and MPC2 can determine the selection values by determining the dot product of the vectors for the digital component.

The computing system MPC1 identifies eligible digital components (404). The computing system MPC2 also identifies eligible digital components (406). An eligible digital component is a digital component having a digital component selection item that is eligible for selection based on the contextual data of the digital component request.

In some implementations, the computing systems MPC1 and MPC2 determine whether each stored and/or JIT digital component is eligible using an eligibility expression for the digital component. The output of the eligibility check can be an eligibility parameter that indicates whether the digital component selection item (and its digital component and corresponding selection value) is eligible for selection for distribution to the client device 110 for display in response to the digital component request. In some implementations, the eligibility parameter eligibility_check$_i$ for digital component selection item "i" can be in cleartext. In some implementations, the eligibility parameter eligibility_check$_i$ for digital component selection item i can be in secret shares, with computing system MPC1 having a first secret share [eligbility_check$_{i,1}$] and computing system MPC2 having a second secret share [eligbility_check$_{i,2}$]. Brackets are used to represent secret shares of parameters. An example process for determining whether a digital component is described with reference to FIG. 5.

For each eligible digital component, the computing systems MPC1 and MPC2 determine whether the digital component selection item is a candidate for being selected for distribution to the client device 110 in response to the digital component request (408). The candidate digital component selection items are the eligible digital component selection items that satisfy the eligibility criteria for the digital component, if the digital component is a conditional digital component. Each unconditional digital component that is eligible based on context is also a candidate digital component. The computing systems MPC1 and MPC2 can determine the candidate digital component selection items using a secure MPC process such that neither computing system MPC1 or MPC2 can identify the candidate digital components in cleartext.

For user group membership conditions, the computing systems MPC1 and MPC2 can calculate respective secret shares of a user group membership condition parameter ug_check$_i$ for each eligible digital component selection item "i." The first secret share of the user group membership condition parameter ug_check$_i$ maintained by the computing system MPC1 can be represented as [ug_check$_{i,1}$] and the second secret share of the user group membership condition parameter ug_check$_i$ maintained by the computing system MPC2 can be represented as [ug_check$_{i,2}$].

For implementations in which a cuckoo filter is used to represent the user group membership for a user, the computing system MPC1 calculates, in collaboration with computing system MPC2, [ug_check$_{i,1}$] according to relationship 1 below:

$$0 == \Pi_{i=1}^{N}([M_{F_i(ug\_id(x)),1}]-PRF(ug\_id(x),rand\_val1a))$$
$$\text{and } 0 \neq \Pi_{i=1}^{N}([M_{F_i(block\_id(x)),1}]-PRF(block\_id(x), rand\_val1b)$$

In relationship 1, Π denotes the multiplication of multiple items. Here, ug_id(x) is a function used to retrieve the user group identifier ug_id associated with a selection value x, $\{F_1, \ldots F_N\}$ is a set of hash functions to calculate possible index of an item within the cuckoo filter table A, and rand_val1a is the random value received in the digital component request. $[M_{x,1}]$ is the x-th element in the array $[M_1]$. == is the equality test between a cleartext integer and a secret share of a secret integer. The result of == is a secret share of a secret integer that is either 0 (not equal) or 1 (equal). Here, the value of $[M_{i,1}]=[PRF(rand\_val2a, i)_1]$.

Similarly, computing system MPC2 calculates, in collaboration with computing system MPC2, [ug_check$_{i,2}$] according to relationship 2 below:

$$0 == \Pi_{i=1}^{N}([M_{F_i(ug\_id(x)),2}]-PRF(ug\_id(x),rand\_val1a))$$
$$\text{AND } 0 \neq \Pi_{i=1}^{N}([M_{F_i(block\_id(x)),2}]-PRF(block\_id(x),rand\_val1b))$$

Here, the value of $[M_{i,2}]=B_i$.

For digital component selection items that are conditioned on user group membership of the user for which a digital component is being selected, the computing systems MPC1 and MPC2 can calculate the secret shares [ug_check$_{i,1}$] and [ug_check$_{i,2}$] of the user group membership condition parameter ug_check$_i$. The combination of the two secret shares can be a Boolean value representing whether the user is a member of the user group corresponding to the digital component. For example, a value of one can represent that the user is a member and a value of zero can represent that the user is not a member. For digital component selection items that are not conditioned on user group membership of the user, the computing systems MPC1 and MPC2 can use default values for the secret shares [ug_check$_{i,1}$] and [ug_check$_{i,2}$] such that the combination has a value (e.g., one) indicating that the user is a member of the user group corresponding to the digital component selection item.

In implementations in which a Bloom filter is used to represent the user group membership of a user, the computing systems MPC1 and MPC2 can query the Bloom filter. The result is that computing system MPC1 has, for each hash function of the Bloom filter, a first secret share [ug_check$_{i,1}$] of the user group membership condition parameter. Similarly, computing system MPC2 has, for each hash function of the Bloom filter, a second secret share [ug_check$_{i,2}$] of the user group membership condition parameter. For a digital component to satisfy the user group membership condition, the user group membership condition parameter, i.e., ug_check$_i$, for each hash value of the Bloom filter would need to have a Boolean value of true, or one. To check whether the user belongs to a particular user group, assuming that the Bloom filter has N hash functions that hashes to N array indices, all the Boolean values of those N indices must be one or True. At the implementation level, each ug_check parameter can be the result of bitwise AND of N secret shares. The secret shares for each hash value can be included in the final calculation of the secret shares of the candidate parameter for the digital component selection item.

The computing systems MPC1 and MPC2 can also collaborate to calculate respective secret shares [blocked_check$_{i,1}$] and [blocked_check$_{i,2}$] of a blocked digital component parameter blocked_check$_i$ for each digital component selection item i that is conditioned on frequency controls or muting. The combination of the two secrets shares can be a Boolean value representing whether the digital component satisfies the blocked digital component condition based on frequency controls (e.g., the digital component has not been provided to the user more than a threshold number of times during a duration of time) and/or based on whether the user selected to not have the digital component displayed to the user. For example, a Boolean value of true or a value of one can represent that the digital component can be displayed to the user based on these factors and a Boolean value of false or a value of zero can represent that the digital component cannot be displayed to the user based on these factors.

To determine the secret shares of the blocked digital component parameter, the computing systems MPC1 and MPC2 can use shares, e.g., arrays, of a Bloom filter that represents identifiers for blocked digital components. The application 112 can generate a Bloom filter that represents the identifiers for the blocked digital components and send data representing the Bloom filter to the computing systems MPC1 and MPC2. The computing systems MPC1 and MPC2 can then query the Bloom filter using arrays representing the Bloom filter to obtain the secret shares [blocked_check$_{i,1}$] and [blocked_check$_{i,2}$].

The computing systems MPC1 and MPC2 can also collaborate to calculate respective secret shares [pacing_check$_{i,1}$] and [pacing_check$_{i,2}$] of a pacing control check parameter pacing_check$_i$ for each digital component selection item i that is paced, e.g., using a feedback controller. The combination of the two secrets shares can be a Boolean value representing whether the digital component selection item satisfies the pacing condition, e.g., based on the output of the feedback controller. For example, if the digital component is being provided too frequently in relation to the target impression rate, the output of the feedback controller can indicate that the digital component is not eligible for this digital component selection process. A Boolean value of true or a value of one can represent that the digital component selection item satisfies the pacing condition, e.g., is not being throttled for this selection process, and a Boolean value of false or a value of zero can indicate that the digital component selection item does not satisfy the pacing condition, e.g., is being throttled for this selection process.

To enforce resource depletion (e.g., budget) and pacing rules, the computing systems MPC1 and MPC2 can randomly block a digital component from participating in the digital component selection process using a probability that is determined using the feedback controller and a resource depletion condition. If a campaign that includes a digital component does not have any additional resources, the probability is set to one. Otherwise, if the campaign is ahead of the delivery schedule, the probability is higher such that the computing systems MPC1 and MPC2 are more likely to block the digital component from the digital component selection process, e.g., by calculating secret shares [pacing_check$_{i,1}$] and [pacing_check$_{i,2}$] such that the pacing control check parameter pacing_check$_i$ has a value of zero. If the campaign is behind the delivery schedule, the probability is lower.

The computing systems MPC1 and MPC2 can periodically calculate a pacing selector parameter pacing_selector for each campaign in additive secret shares using the feedback controller. Conceptually, the pacing selector parameter is the throttling probability, scaled up by a factor of a maximum range.

For each digital component request and each digital component selection item, the computing systems MPC1 and MPC2 calculate a secret number uniformly distributed in [0, maximum range]. If the random number is less than or equal to the pacing selector parameter pacing_selector, the computing systems MPC1 and MPC2 block the digital component selection item from participating in the digital component selection process, e.g., by calculating secret shares [pacing_check$_{i,1}$] and [pacing_check$_{i,2}$] such that the pacing control check parameter pacing_check$_i$ has a value of zero.

To protect user privacy and confidential information of the participants in the digital component selection process, both the random number and the pacing selector parameter are in additive secret shares. The comparison between two secret shares can be performed using a garbled circuit protocol. By limiting both secret shares to six or seven bits, the comparison protocol may take one or two rounds of communication between the computing systems MPC1 and MPC2.

To determine the pacing selector parameter for a campaign, the computing systems can calculate the amount of resources used for each campaign as resources_used_campaign=Σ(clearing_value×is_dc_the_winner), where the sum is across all of the digital component selection processes that include the digital component of the campaign, the parameter clearing_value is the clearing value for the digital component selection process, and is_dc_the_winner is the winner parameter for the digital component in the digital component selection process. This computation can be performed in secret shares such that each computing system MPC1 and MPC2 holds a secret share of the amount of resources used. The computing systems MP1 and MPC2 can then calculate a resources exhausted parameter resources_exhausted for the campaign by determining whether the amount of resources used, i.e. resources_used_campaign, is greater than the total amount of resources allocated for the campaign in secret shares.

The computing systems MPC1 and MPC2 can calculate the pacing selector parameter pacing_selector for each campaign as pacing_selector=resources_exhausted×maximum range+(1−resources_exhausted)×output, where the parameter output is the output of the feedback controller. This calculation can use one RPC between the computing systems MPC1 and MPC2 to compute multiplication in secret shares. However, the calculation can be performed offline periodically to prevent any added latency.

The computing systems MPC1 and MPC2 can also collaborate to calculate respective secret shares of [kanonymity_check$_{i,1}$] and [kanonymity_check$_{i,2}$] of a k-anonymity check parameter kanonymity_check$_i$ for each digital component selection item i that must satisfy a k-anonymity condition, which can apply to all digital components in some implementations. The combination of the two secret shares can be a Boolean value representing whether the digital component selection item satisfies the k-anonymity condition. For example, a value of one can represent that the digital component selection item satisfies k-anonymity and a value of zero can represent that the digital component selection item does not satisfy k-anonymity and should be blocked from digital component selection processes.

For each condition of each conditional digital component (e.g., digital components that have at least one condition), each computing system MPC1 and MPC2 can store a corresponding secret share of the parameter for each condition for the digital component selection item corresponding to the digital component. In this way, as long as at least one MPC computing system is honest, neither computing system MPC1 nor MPC2 knows the value of the parameter in cleartext. Each digital component selection item can be conditioned on zero or more of the conditions. For a given digital component selection process, some digital component selection items can have different conditions and/or different quantities of conditions than other digital component selection items.

In some implementations, the only condition for digital component selection items have to satisfy to be included in a digital component selection process is the eligibility condition based on the contextual data. In this example, the other conditions (e.g., k-anonymity, pacing, etc.) are not considered.

Although some example conditions are provided above, other conditions can also be used. In general, the computing systems MPC1 and MPC2 can calculate the secret shares of the condition parameters using a secure MPC process. The criteria and techniques for determining the condition parameters can vary. In some implementations, the secret shares of the condition parameters can be received from another computing system, e.g., such that the computing systems MPC1 and MPC2 do not compute the condition parameters.

The computing systems MPC1 and MPC2 can determine whether a conditional digital component selection item (and therefore its digital component and corresponding selection value) is a candidate for the digital component selection process using the secret shares of the condition parameters. The computing systems MPC1 and MPC2 can calculate secret shares of a candidate parameter is_dc_a_candidate$_i$ for each conditional digital component selection item i using the secret shares of the condition parameter(s) for the conditional digital component selection item. In general, if a conditional digital component is conditioned on each of the conditions described above, the candidate parameter for digital component i can be calculated using relationship 3 below:

$$\text{is\_dc\_a\_candidate}_i = \text{ug\_check}_i \text{ AND blocked\_check}_i \text{ AND pacing\_check}_i \text{ AND kanonymity\_check}_i$$

In this example, only AND operators are used, but other Boolean operators, such as OR, XOR, and NOT can also be used. As the value of each condition parameter is in secret shares, the computing systems MPC1 and MPC2 can collaborate in a secure MPC process using round trip Remote Procedure Calls (RPCs) to determine corresponding secret shares [is_dc_a_candidate$_{i,1}$] and [is_dc_a_candidate$_{i,2}$] of the candidate parameter for digital component selection item i using the secret shares of the condition parameters. Any appropriate secret sharing algorithm for determining logical AND operations can be used to determine the secret shares [is_dc_a_candidate$_{i,1}$] and [is_dc_a_candidate$_{i,2}$] of the candidate parameter for digital component selection item i. The computing systems MPC1 and MPC2 can determine the secret shares of the candidate parameter using only the secret shares of the condition parameters for those conditions. As the end of this secure MPC process, computing system MPC1 holds the first secret share [is_dc_a_candidate$_{i,1}$] of the candidate parameter for each conditional digital component selection item and computing system MPC2 holds the second secret share [is_dc_a_candidate$_{i,2}$] of the candidate parameter for each conditional digital component selection item.

In some implementations, the computing systems MPC1 and MPC2 evaluate relationship 3 for each digital component using a garbled circuits protocol. In this example, one of the computing systems MPC1 or MPC2 can construct the garbled circuit. For this example, assume that computing system MPC1 constructs the garbled circuit. Computing system MPC1 knows its own secret shares and also knows that there is only one possible bit pattern that computing system MPC2's secret shares must hold in order for the candidate parameter for the digital component to become true, or one. With such property, computing system MPC1 only needs up to 50 gates to construct the garbled circuit, e.g., if there are a total of about 50 Boolean parameters in relationship 3.

In relationship 3, there is only one user group membership condition parameter ug_check$_i$. However, if a Bloom filter is used to represent the user group membership for a user, relationship 3 can include a respective user group membership condition parameter ug_check$_i$ for each hash function of the Bloom filter. Similarly, if the blocked digital components are represented using a Bloom filter, relationship 3 would include a respective blocked digital component parameter blocked_check$_i$ for each hash function of this Bloom filter. In relationship 3, pacing_check$_i$ is only present if the owner of the digital component enables pacing check.

The computing system MPC1 determines an order of the digital component selection items based on the selection values (410). Similarly, the computing system MPC2 determines an order of the digital component selection items based on the selection values (412). These two orders should be exactly the same because the input to the ordering process is the same on the two computing systems MPC1 and MPC2. Each computing system MPC1 and MPC2 can determine an order of the digital component selection items. Each order can include candidate digital components that were evaluated for candidate eligibility in step 408 and other digital components. For example, the order can include all available digital components that are available for the digital component selection process, all eligible digital components for the digital component selection process (e.g., eligible based on contextual data), or all digital components maintained by the MPC cluster 130. The order can be from the digital component selection item having the highest selection value to the digital component selection item having the lowest selection value. In some implementations, the selection values used for the order can be the value that would be provided to the publisher 140 of the resource with which a selected digital component would be displayed, e.g., after any sharing with a DSP 150 and/or SSP 170.

As the selection values are in cleartext, the computing systems MPC1 and MPC2 do not have to perform any roundtrip computations to determine the order of the digital component selection items. Instead, each computing system MPC1 and MPC2 can order the digital component selection items independently. If the selection values were stored as secret shares at each computing system MPC1 and MPC2, with each computing system MPC1 and MPC2 having a respective secret share of each selection value, the computing systems MPC1 and MPC2 can perform a secure MPC process using roundtrip computations to order the digital component selection items based on selection values. If there is a tie between two or more selection values, the computing systems MPC1 and MPC2 can break the tie deterministically using other metadata for the digital component selection items corresponding to these selection values.

The computing systems MPC1 and MPC2 determine secret shares of an accumulated value for each candidate digital component selection item (414). Conceptually, the accumulated value for a given digital component selection item represents a total number of candidate digital component selection items from the top of the order to given digital component selection item, excluding the given digital component selection item even if the given digital component selection item is a candidate. That is, the accumulated value represents a number of candidate digital component selection items that are more preferable and/or eligible for selection than the given digital component selection item. This concept is shown in Table 1 below.

TABLE 1

| Ordered Selection Values | is_dc_a_candidate | Accumulated Value (acc) | Is Accumulated Value Equal to 0? |
|---|---|---|---|
| Highest | 0 | 0 | 1 |
| 2$^{nd}$ Highest | 1 | 0 | 1 |
| 3$^{rd}$ Highest | 0 | 1 | 0 |

TABLE 1-continued

| Ordered Selection Values | is_dc_a_candidate | Accumulated Value (acc) | Is Accumulated Value Equal to 0? |
|---|---|---|---|
| 4$^{th}$ Highest | 1 | 1 | 0 |
| ... | ... | ... | ... |

In some implementations, the accumulated value for a given digital component selection item represents a total number of candidate digital component selection items from the top of the order to the given digital component selection item, including the given digital component selection item if the given digital component selection item is a candidate. In this example, the fourth column would represent whether the accumulated value is equal to one rather than zero. For brevity, the remaining discussion will be in terms of the first example in which the accumulated value for a given digital component selection item represents a total number of candidate digital component selection items from the top of the order to the given digital component selection item, excluding the given digital component selection item even if the given digital component selection item is a candidate.

Conceptually, in Table 1, the accumulated value (acc) is incremented for each digital component selection item that has a candidate parameter is_dc_a_candidate equal to one as it progresses from the top of the order to the bottom of the order. As described below, the calculation of the accumulated values acc is performed in secret shares. For example, the accumulated value acc for the digital component selection item having the highest selection value is zero as the candidate parameter is_dc_a_candidate for the highest selection value is equal to zero. The accumulated value acc for the second highest digital component selection item (the one having the second highest selection value) is also zero as the candidate parameter is_dc_a_candidate for the second highest digital component selection item is equal to one but none of the digital component selection items above the second highest digital component selection item has a candidate parameter is_dc_a_candidate equal to one. Moving down the order, accumulated value acc for the candidate parameter is_dc_a_candidate for the third highest selection digital component selection item (the one having the third highest selection value) is incremented to a value of one based on the candidate parameter is_dc_a_candidate for the second highest digital component selection item having a value of one. As the candidate parameter is_dc_a_candidate for the third highest digital component selection item is zero, the accumulated value ace for the fourth highest digital component selection item (the one having the fourth highest selection value) is not incremented and has a value of zero like the third highest digital component selection item.

Using Table 1, the computing systems MPC1 and MPC2 would select, for distribution to the client device 110, the digital component of the digital component selection item corresponding to the selection value for which the overall candidate parameter is_dc_a_candidate has a value of one and the accumulated value acc has a value of zero, as indicated in the fourth column of Table 1. This represents the digital component corresponding to the highest ordered selection value for which the candidate parameter is_dc_a_candidate has a value of one. As the candidate parameter is_dc_a_candidate is in secret shares for the computing systems MPC1 and MPC2 to maintain user privacy and ensure that user data is not leaked, the computing systems MPC1 and MPC2 determine secret shares of the accumulated value acc for each digital component and use roundtrip computations to determine which digital component has an accumulated value acc that is equal to zero and a candidate parameter is_dc_a_candidate that is equal to one.

The computing systems MPC1 and MPC2 can determine their secret shares of the accumulated value acc for each digital component selection item independently without any roundtrip computations in some implementations depending on the secret share algorithm. For example, computing system MPC1 can determine, for each digital component selection item i, a first share $[acc_{i,1}]$ of the accumulated value acc by traversing all of the digital components in order from highest to lowest and summing the candidate parameters is_dc_a_candidate for the digital component selection items along the way, as described above with reference to Table 1. Similarly, computing system MPC2 can determine, for each digital component selection item i, a second share $[acc_{i,2}]$ of the accumulated value ace by traversing all of the digital component selection items in order from highest to lowest and summing the candidate parameters is_dc_a_candidate for the digital component selection items along the way.

The computing systems MPC1 and MPC2 determine, for each digital component selection item, secret shares of a result that indicates whether the accumulated value has a specified value (416). The specified value can be a value of zero, as shown in columns 3 and 4 of Table 1. As described above, the digital component selection item for which the accumulated value is zero and the overall candidate parameter is_dc_a_candidate is one is the digital component selection item having the highest selection value among the candidate digital component selection items.

The computing systems MPC1 and MPC2 can engage in multiple rounds of computations, e.g., multiple RPCs, as part of a secure MPC process to calculate the equality operation $acc_i==0$ in terms of secret shares for each digital component selection item i. The equality operation is used to determine whether the accumulated value $acc_i$ for the digital component selection item i has a value of zero. At the end of this process, computing system MPC1 has, for each digital component selection item i, one secret share of the result $acc_i==0$, and computing system MPC2 has, for each digital component selection item i, the other secret share of the result $acc_i==0$.

The computing systems MPC1 and MPC2 determine secret shares of a winner parameter is_dc_the_winner$_i$ for each digital component selection item i (418). The computing systems MPC1 and MPC2 can determine the winner parameters is_dc_the_winner$_i$ based on, for each digital component selection item i, the secret shares of the accumulated value $acc_i==0$ and the secret shares of the candidate parameter is_dc_a_candidate$_i$ for each digital component selection item i. The winner parameter is_dc_the_winner$_i$ for each digital component selection item i can be a Boolean value that indicates whether the digital component selection item i (and its digital component) is the winner of the selection process, e.g., whether the digital component of digital component selection item i is selected for distribution to the client device 110 in response to the digital component request.

In some implementations, computing system MPC1 and MPC2 can carry out secret share multiplication protocol to calculate, for each selection value, the winner parameter is_dc_the_winner$_i$==(is_dc_a_candidate$_i$×($acc_i$==0)) in terms of secret shares. This can include one RPC between the computing systems MPC1 and MPC2 to multiple two secret shares. At the end of this MPC process, computing system MPC1 has one secret share of the result is_dc_the_winner$_i$ represented as [is_dc_the_winner$_{i,1}$]=[is_dc_a_candidate$_{i,1}$]×([$acc_{i,1}$]=1). Similarly, computing system MPC2 has the other secret share of the result is_dc_the_winner$_i$ represented as [is_dc_the_winner$_{i,2}$]=[is_dc_a_candidate$_{i,2}$]×([$acc_{i,2}$]=0). Note that for all digital component selection items, at most one digital component selection item has a winner parameter is_dc_the_winner$_i$ that is equal to one, which is the digital component selection item having the digital component that is selected for distribution to the client device 110. All others would equal zero.

The computing systems MPC1 and MPC2 determine a selection result (420). In some implementations, the computing systems MPC1 and MPC2 can calculate the selection result based on the winner parameters for the digital component selection items and the digital component information element dc_information_element for the digital components. As described above, the digital component information element de_information_element for a digital component can include the selection value for the digital component and other data for the digital component.

Conceptually, the computing systems MPC1 and MPC2 can calculate the selection result parameter "result" using relationship 4 below.

$$result=\Sigma_i \text{ is\_}dc\text{\_the\_winner}_i \times dc\text{\_information\_element}_i$$

That is, the computing systems MPC1 and MPC2 can determine, across all of the digital component selection items, the sum of the products of the winner parameter is_dc_the_winner$_i$ and the digital component information element dc_information_element$_i$. In this example, the selection result will either have a value zero if there are no candidate digital components or will have a value equal to the digital component information element dc_information_element of the selected digital component selection item that has a winner parameter is_dc_the_winner$_i$ that is equal to one. In another example, the digital component information element dc_information_element can be replaced in relationship 4 with the selection values for the digital components. In this example, the selection result will either have a value zero if there are no candidate digital component selection items or will have a value equal to the selection value of the selected digital component selection item that has a winner parameter is_dc_the_winner$_i$ that is equal to one.

To perform the calculation in secret shares, computing system MPC1 takes all of the digital component selection items and multiplies the digital component information element dc_information_element$_i$ for the digital component selection item, which can be in cleartext, by the first secret share of the winner parameter [is_dc_the_winner$_{i,1}$] for the digital component selection item. The computing system MPC1 can then determine the sum of these products and return the sum to the client device 110 that submitted the digital component request. That is, computing system MPC1 can determine, as a first secret share [result$_1$] of the result, the sum using relationship 5 below.

$$[result_1]=\Sigma_i([\text{is\_}dc\text{\_the\_winner}_i] \times dc\text{\_information\_element}_i)$$

The computing system MPC2 can perform a similar calculation to determine the second secret share [result$_2$] of the result using relationship 6 below.

$$[result_2]=>i([\text{is\_}dc\text{\_the\_winner}_i] \times dc\text{\_information\_element}_i)$$

In some implementations, the performance of the MPC cluster 130 can be improved (e.g., by reducing computations and roundtrip communications between the computing systems MPC1 and MPC2) by replacing multiplications performed in secret shares with bitwise AND operations and replacing summations with bitwise XOR operations. In some implementations, garbled circuits can be used to evaluate the various relationships, resulting in reduced computations and roundtrip communications. For example, MPC1 can act as the garbler and MPC2 can act as the evaluator in a garbled circuits implementation.

The computing system MPC1 sends the first share of the selection result [$result_1$] to the client device 110 (422). Similarly, the computing system MPC2 sends the second share of the selection result [$result_2$] to the client device 110 (424). The application 112 can then reconstruct the selection result result in cleartext using the two secret shares [$result_1$] and [$result_2$], e.g., by determining a sum of the secret shares if additive secret share algorithms are adopted. If the selection result has a value of zero, then the MPC cluster 130 did not identify a digital component for distribution to the client device 110. Otherwise, the selection result has a value equal to a digital component information element dc_information_element. The application 112 can parse the digital component information element dc_information_element to obtain the selection value and the metadata for the digital component. The application 112 can then either display the digital component or perform a selection process using the digital component and other digital components received from an SSP 170, as described above.

In some implementations, the selected digital component is sent to the client device 110 using a mask to prevent either computing system MPC1 or MPC2 from being able to access the selected digital component in cleartext and to reduce latency and bandwidth consumption in sending the digital component to the client device 110. In this example, the application 112 can select a nonce for each digital component request and send the nonce with the digital component request. The application 112 can send the nonce to one of the computing systems MPC1 or MPC2. For the purpose of an example, assume that the nonce is sent to computing system MPC2.

Both the application 112 and the computing system MPC2 can independently calculate a mask of the same size as the largest digital component creative with the same algorithm and the same input. For example, the $i_{th}$ bit of the mask can be represented as PRF(nonce, i), where PRF represents a pseudorandom function. Both the application 112 and the computing system MPC2 can keep the nonce and mask strictly confidential from computing system MPC1.

To send the selected digital component to the application 112, computing system MPC2 can send [$result_2$] bitwise-XOR mask to computing system MPC1. The computing system MPC1 then sends [$result_1$] bitwise-XOR ([$result_2$] bitwise-XOR mask) to the application 112 as the selection result, e.g., as the response to the digital component request.

The application 112 can calculate [$result_1$] bitwise-XOR ([$result_2$] bitwise-XOR mask) bitwise-XOR mask as the creative for the digital component. This is equivalent to [$result_1$] bitwise-XOR [$result_2$]. This reduces the bandwidth required to the size of the largest creative, while preserving the private information retrieval guarantee. This reduces the bandwidth of the response relative to sending the two secret shares of the selection result, as described above. In this way, there is little or no additional latency or bandwidth consumption in this privacy preserving technique relative to sending a digital component creative as in other processes.

Figure 5:
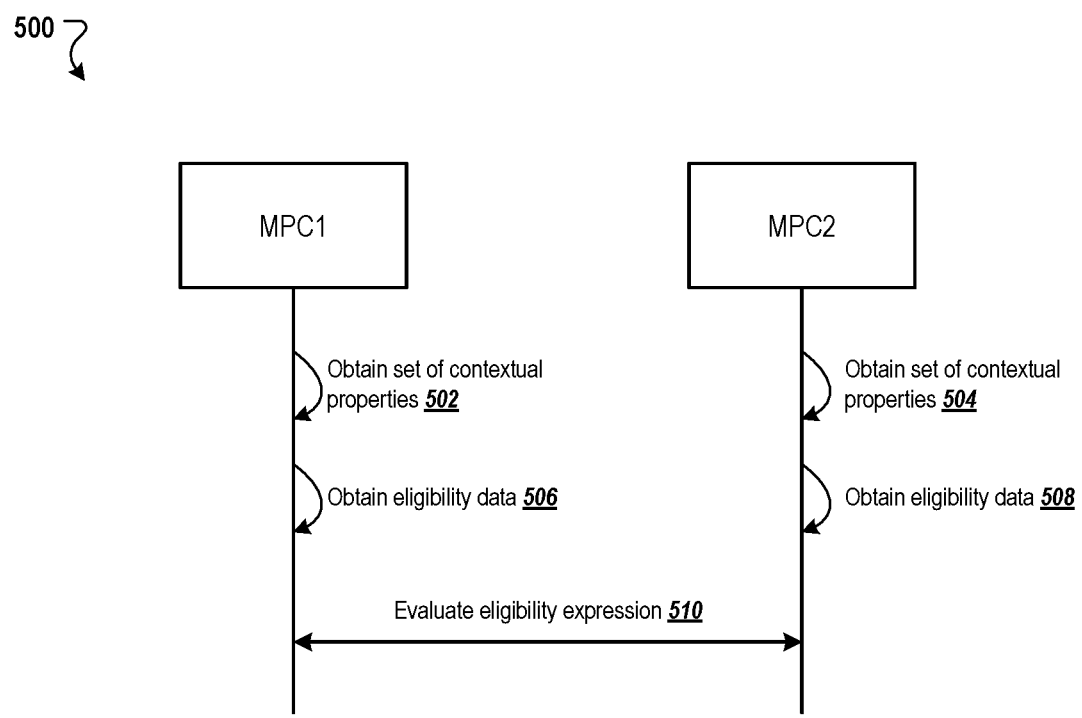
FIG. 5 is a diagram of an example process for determining whether a digital component is eligible for selection.

FIG. 5 is a diagram of an example process for determining whether a digital component is eligible for selection. Operations of the process 500 can be implemented, for example, by the computing systems MPC1 and MPC2 of the MPC cluster 130. Operations of the process 500 can also be implemented as instructions stored on one or more computer readable media which may be non-transitory, and execution of the instructions by one or more data processing apparatus can cause the one or more data processing apparatus to perform the operations of the process 500.

The computing system MPC1 obtains a set of contextual properties of an environment in which a selected digital component will be displayed at a client device (502). The computing system MPC2 also obtains the same set of contextual properties (504).

The set of contextual properties can be received from the client device 110 and/or content platforms, e.g., an SSP 170 and/or one or more DSPs 150. For example, the client device 110 can provide, to the computing systems MPC1 and MPC2, the set of contextual properties along with a digital component request. The content platforms can also infer contextual properties for the environment, as described above. As described above, the contextual properties can include data about the resource with which the digital component will be displayed, data about the user of the client device 110, data about the application 112 that will display the digital component, data about the client device 110, and/or general contextual data (e.g., date and time of day).

The set of properties can be in the form of a vector of properties. In some implementations, each computing system MPC1 and MPC2 receive a respective secret share of the set of contextual properties, e.g., a respective secret share of the vector of contextual properties.

The computing system MPC1 obtains eligibility data for a digital component selection item (506). The computing system MPC2 also obtains eligibility data for the digital component selection item (508). The eligibility data can include an eligibility expression and/or eligibility criteria that defines the contextual environments for which the digital component and selection value of the digital component selection item are available for inclusion in a digital component selection process.

The eligibility expression can be in the form of a Boolean expression that includes sub-expressions that are based on the eligibility criteria and a Boolean operator between each pair of sub-expressions, such as a Boolean AND, Boolean OR, we well as unary Boolean NOT. A Boolean NOT operator can operate on a single parameter rather than an operation on multiple parameters. Each sub-expression can be based on one or more contextual properties. For example, one sub-expression may request that the geographic location of the client device 110 that will display the digital component is located in a particular geographic region and another sub-expression may require that the topic of the resource with which the digital component will be displayed has one of a set of topics. In this example, the eligibility expression can be represented as: location of client device=particular geographic region AND resource topic ∈ set of topics.

In some cases, e.g., when a digital component selection item's eligibility is conditioned on a single contextual property, the eligibility expression may only include a single sub-expression. However, the MPC cluster 130 can support arbitrary Boolean expressions, for example, Boolean expressions that include multiple sub-expressions and logical operators between the sub-expressions to provide fine grain control over how digital components are displayed with resources.

In some implementations, the content platforms provide the eligibility expressions for digital components. In such cases, to protect business confidential information, the content platforms can provide respective secret shares of the eligibility expression and the corresponding eligibility criteria to the computing systems MPC1 and MPC2. In this example, computing system MPC1 would receive a first secret share of the eligibility expression and a first secret share of the eligibility criteria. Similarly, computing system MPC2 would receive a second secret share of the eligibility expression and a second secret share of the eligibility criteria.

The content platforms can also provide the eligibility expressions and eligibility criteria in cleartext. For example, a content platform can provide an eligibility expression in the form of a script function or other computer-readable code. In such examples, the computing systems MPC1 and MPC2 can determine whether a digital component selection item is eligible by executing the script or other code in a sandbox environment. The sandbox environment can be isolated from other code execution. Using a sandbox environment can prevent the script from making any input/output requests or obtaining any data that is not provided to the sandbox environment, e.g., to preserve user data privacy and protect the computing systems MPC1 and MPC2 from malicious code.

In some implementations, the MPC cluster 130 builds an eligibility expression based on eligibility criteria and/or eligibility expressions provided by the content platforms. For example, a DSP 150 can provide, for one of its digital components, a sub-expression that defines when the digital component is eligible. Similarly, an SSP 170 can provide, for a resource, a sub-expression that defines properties of digital components that are not allowed to be displayed with the resource. When the digital component request is for display of a digital component with the resource, the MPC cluster 130 can access the sub-expression(s) for the resource and the sub-expression(s) for the digital component and build the eligibility expression. For example, the computing systems MPC1 and MPC2 can combine the sub-expression(s) for the SSP 170 with the sub-expression(s) for the DSP 150 using an AND operator since both sets of sub-expressions would need to be satisfied for the digital component to be eligible for display with the resource. If the eligibility expressions are provided to the computing systems MPC1 and MPC2 using secret shares, the computing systems MPC1 and MPC2 can evaluate whether both sets of sub-expressions are satisfied using a secure MPC process, as described below.

Using eligibility expressions reduces the amount of data stored by the computing systems MPC1 and MPC2 relative to the use of large cache lookup keys. This also increases the flexibility in the publisher and digital component provider control over the display of digital components, without increasing the data storage requirements of the computing systems MPC1 and MPC2, which enables the computing systems MPC1 and MPC2 to store more digital components, information for the digital components, and/or other related information in high speed memory, e.g., in high speed caches.

The MPC cluster 130 can support various types of sub-expressions and can evaluate each type using secure MPC processes based on secret shares of eligibility criteria. Some example types include set intersection checks, equality tests, comparisons, and truth tables.

A set intersection check can be used to determine whether a property is a member of a set of properties. This can be used to determine whether a digital component has a property that the publisher of the resource does not want displayed with its resource. For example, the publisher may block digital components having content related to a particular item. The set intersection check can be used to check whether the particular item matches one of the properties in the set of properties for the digital component.

Each digital component selection item can have a set of properties, which can be represented as $S_{dcsi}$. Some properties of a digital component can be determined and attached to a digital component selection item by the SSP 170 on behalf of publishers. For example, during a digital component review process, the SSP 170 may determine that a digital component is about the particular item and attach the particular item as one of the SSP-determined properties to the digital component selection item. The set of SSP-determined properties can be referred to as $S_{dcsi,SSP}$.

The SSP 170 can instruct the MPC cluster 130 to not select digital components related to the particular item on the resources of the publisher, e.g., by providing an expression $P \in S_{dcsi}$, where P represents the excluded property (i.e., the particular item) and $S_{dcsi}$ represents the properties of the digital component, which can include properties inferred by the SSP 170. The SSP 170 can instruct the MPC cluster 130 that, if the property is in the set of properties of the digital component, the digital component is not eligible for selection.

Similarly, some properties of a digital component can be determined and attached to the digital component selection item by a DSP 150 on behalf of the digital component provider 160 that publishes the digital component. If the DSP only wants the digital component to be displayed with resources related to sports, the DSP 150 can add the property "sport" to the digital component selection item as one of the DSP-determined properties. The set of DSP-determined properties can be referred to as $S_{dcsi,DSP}$.

The DSP 150 can instruct the MPC cluster 130 to enable the digital component to be eligible for selection if a particular property, e.g., "sports," is included in the set of contextual properties for the digital component request. To do so, the DSP 150 can provide the expression $P \in S_{dcsi}$, where P represents one or more desired properties (i.e., sport) for which the digital component is eligible and $S_{dcsi}$ represents the properties of the digital component. The DSP 150 can instruct the MPC cluster 130 that, if the property is in the set of properties of the digital component, the digital component is not eligible for selection.

An equality test can be used to determine whether a property has a particular value. For example, the geographic location of a client device 110 can have many different values, while a DSP 150 may only want a particular selection value for a digital component to be eligible in one of the possible locations. The equality test can be used to determine whether a particular property within the set of contextual properties has a particular value, or whether a particular property of the properties of a digital component has a particular value. A content platform can instruct the MPC cluster 130 to perform an equality test to determine whether a particular property of either the contextual properties or the properties of the digital component have a particular value.

A property can be ordinal with a well-defined comparison test. For example, if a digital component selection item is only valid for users of age 60 or older, the digital component selection item can have an expression with property "minimum age" with a value of 60. The DSP 150 can instruct the MPC cluster 130 to compare the minimum age property to the age of the user, which may be included in the set of contextual properties.

A content platform can generate eligibility expressions that include multiple types of sub-expressions, including one or more set intersection checks, one or more equality tests, and/or one or more comparisons. This provides fine-grained control over the contexts in which a digital component can be displayed and the content of digital components displayed on publisher resources. An example expression can be: particular item$\notin S_{dcsi}$ AND particular state=location of client device AND age of user≥minimum age. In this example, a digital component would only be eligible if the properties of the digital component $S_{dcsi}$ does not include the particular item, the location of the client device 110 is in the particular state, and the age of the user of the client device 110 is at least the minimum age. Although only AND operators are used in this example, other Boolean operators, such as OR, XOR, NOT, etc. can also be used.

The computing systems MPC1 and MPC2 evaluate the eligibility expression (510). The computing systems MPC1 and MPC2 evaluate the eligibility expression for each digital component to determine whether the digital component is eligible for selection. As described above, the evaluation can occur in a sandbox if the eligibility expression and corresponding eligibility criteria are provided to the computing systems MPC1 and MPC2 in cleartext.

In some situations, the properties associated with digital component selection items and/or set of contextual properties for a digital component request may be sensitive or confidential. For example, a DSP 150 may not want to let a particular publisher know that the DSP 150 disallows a particular digital component or set of digital components to be displayed on the publisher's resources due to how resources are categorized. In another example, a SSP 170 may not want to reveal to digital component providers that a particular resource is available for displaying digital components of one provider, but not digital components of another provider.

To prevent such data from being leaked, the MPC cluster 130 can use a secure MPC process to determine whether digital components are eligible. Instead of receiving the set of contextual properties, eligibility expressions, and eligibility criteria in cleartext, each computing system MPC1 and MPC2 can receive respective secret shares of the set of contextual properties, respective secret shares of the eligibility expressions, and respective secret shares of the eligibility criteria. The computing systems MPC1 and MPC2 can then perform the secure MPC process using the secret shares to determine whether a digital component selection item is eligible.

For the set intersection check, the properties can be encoded using vectors, Bloom filters, or distributed point functions (DPFs), e.g., depending on the number of properties to be encoded. If the number of properties is limited, e.g., less than 100, 500, or another appropriate threshold, vectors can be used efficiently. To protect confidential information, a vector or properties can be split into two vectors of additive secret shares in $Z_2$. For example, if the first element of the vector represents whether a digital component selection item is related to a particular item, and the digital component is indeed related to the particular item, there could be a secret vector S where S[0]=1. In this example, element 0) of the vector S represents the particular item. The two vectors of additive secret shares are S1 and S2 respectively, where S1[0] XOR S2[0]==1. In this example, computing system MPC1 can receive the first secret share S1 of the vector S and computing system MPC2 can received the second secret share S2 of the vector S. If the digital component is not related to the particular item, the expressions would be: S[0]=0) and S1[0] XOR S2[0]==0).

Vectors can be used to encode a limited number of properties of digital components of digital component selection items, as well as the set of contextual properties for the digital component request. Let S1 and S2 represent the vectors of secret shares for a digital component selection item held by MPC1 and MPC2, respectively. This vector encodes the properties for the digital component, e.g., the properties of the digital component or properties of environments for which the digital component is eligible or not eligible.

Let P1 and P2 represent the vectors of secret shares for a digital component request held by MPC1 and MPC2 respectively. This vector encodes the contextual properties of the digital component request. Conceptually, let common_properties represent reconstruct(S1, S2)=reconstruct(P1, P2). The computing systems MPC1 and MP2 can compute common_properties in secret shares by evaluating the secret shares of the vectors and comparing the corresponding elements of the vectors using a secure MPC process. If an element in common_properties has a value of one, then both the digital component selection item and the current digital component request share the same property corresponding to the element. When the data type of S and P is Boolean instead of integer, the comparison operation can be optimized to logical XOR, which requires no extra round trip in the secure MPC protocol.

To implement a block list, i.e., the digital component selection item is ineligible for selection if the digital component selection item is associated with any properties specified for the current digital component request, the computing systems MPC1 and MPC2 will check the elements in common_properties computed in secret shares to protect user privacy. If all elements have a value of zero, the digital component selection item is not blocked for the current request.

To implement an enabled list, i.e., the digital component selection item is eligible for selection if the cached bid is associated with any properties specified for the current digital component request, the computing systems MPC1 and MPC2 will check the elements in common_properties. If all elements have a value of zero, the digital component selection item is blocked for the current digital component request.

There are a couple of techniques that can be used to compute common_properties and check whether all elements in common_properties have a value of zero. One technique is Goldreich-Micali-Wigderson (GMW) with Oblivious Transfer (OT) and another approach is garbled circuits. Both approaches utilize one online round of online communication between the two computing systems MPC1 and MPC2.

When there are a large number of properties (e.g., greater than a threshold number of properties), the use of vectors may not be as efficient as using Bloom filters or DPFs. If the average number of properties for a digital component selection item and for a digital component request are small compared to the total number of properties, and if the use case can tolerate some level of false positive rate (FPR), the properties can be encoded in Bloom filters. Otherwise, the properties can be encoded in DPFs. In either solution, the communication bandwidth between content platforms and the MPC cluster 130 is reduced.

For equality tests, assume that, for a digital component selection item, MPC1 and MPC2 hold two secret shares [p1] and [p2], respectively, of the properties for the digital component selection item. For a digital component request, the SSP 170 sends two secret shares [q1] [q2] to MP1 and MPC2 respectively, of the properties for the digital component request (e.g., the set of contextual properties). MPC1 and MPC2 compare whether the two secret messages p and q are equal, where p=reconstruct ([p1], [p2]) and q=reconstruct ([q1], [q2]).

The following two assertions are equivalent: p and q are equal: and p−q=0). With this observation, an alternative protocol is that the MPC cluster 130 can calculate tmp=p−q and determine whether tmp is equal to zero, using secret shares computation. To do so, MPC1 calculates [tmp$_1$]= [p1]−[q1] and MPC2 calculates [tmp1]=[p2]−[q2]. The computing systems MPC1 and MPC2 can then determine whether secret message tmp is equal to zero (i.e., all bits in tmp are zero) using GMW or garbled circuits.

In addition to the expressions described above, the MPC cluster 130 can support truth tables that define the controls for determining whether a digital component selection item is eligible for selection in response to a digital component request. The MPC cluster 130 can generate the truth tables based on eligibility expressions.

After evaluating the various sub-expressions, the computing systems MPC1 and MPC2 can evaluate the Boolean operators of the eligibility expression. As the result of some sub-expressions can be secret shares held by each computing system MPC1 and MPC2, the computing systems MPC1 and MPC can evaluate the Boolean operators using a secure MPC process. The result of this can also be secret shares of an eligibility parameter eligbility_check$_i$ that indicates whether the digital component selection item is eligible. For example, computing system MPC1 can have a first secret share [eligbility_check$_{i,1}$] and computing system MPC2 have a second secret share [eligbility_check$_{i,2}$]. The computing systems MPC1 and MPC2 can then use the secret shares of the eligibility parameter as part of the process for selecting a digital component, as described above.

Figure 6:
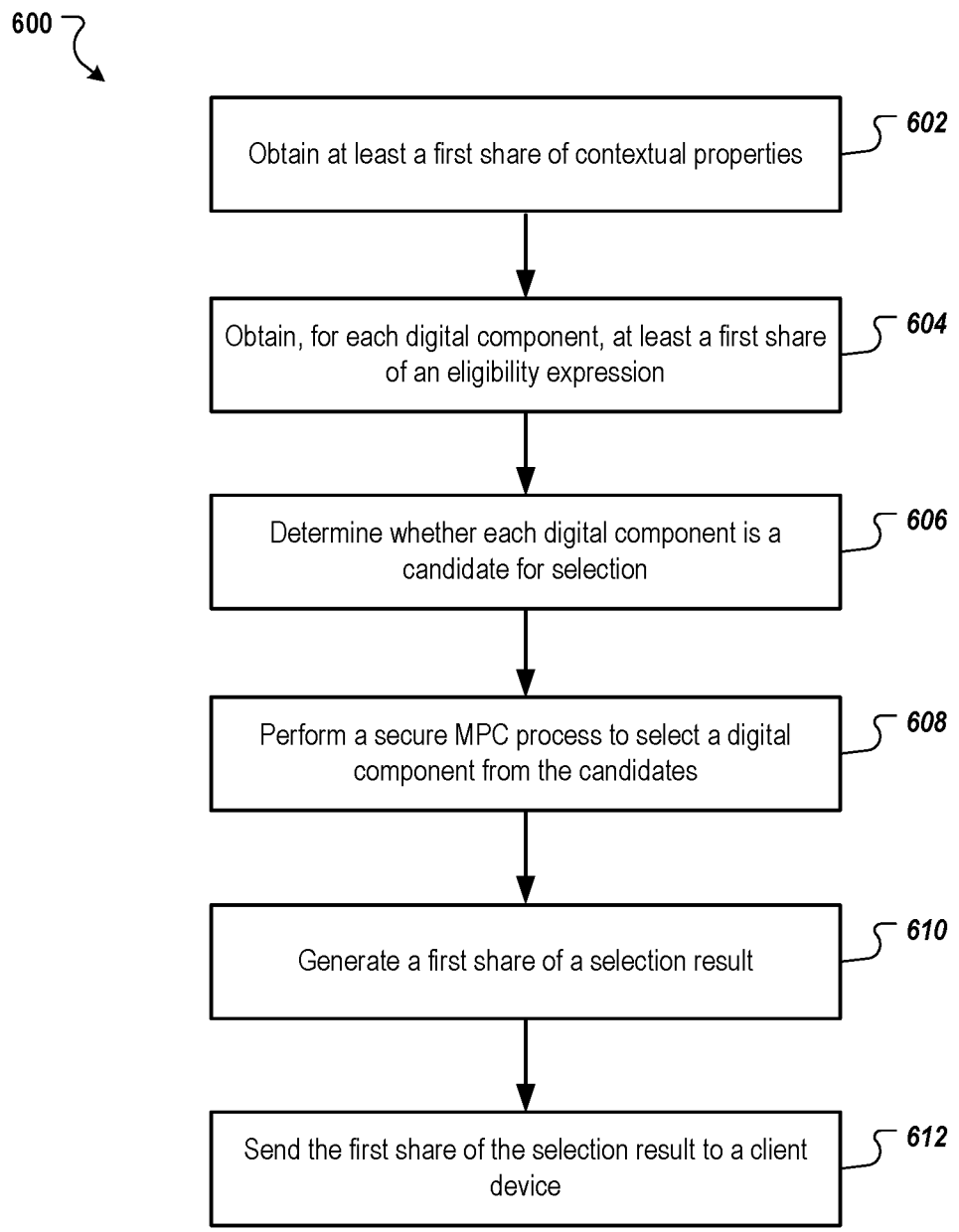
FIG. 6 is a diagram of an example process for selecting a digital component for distribution to a client device.

FIG. 6 is a diagram of an example process 600 for determining a highest other selection value for digital components in a digital component selection process. Operations of the process 600 can be implemented, for example, by a computing system MPC1 or MPC2 of the MPC cluster 130, in collaboration with the other computing system(s) of the MPC cluster 130. Operations of the process 600 can also be implemented as instructions stored on one or more computer readable media which may be non-transitory, and execution of the instructions by one or more data processing apparatus can cause the one or more data processing apparatus to perform the operations of the process 600.

The computing system obtains at least a first share of a set of contextual properties of an environment in which a selected digital component will be displayed at a client device (602). The set of contextual properties can be received from the client device 110 and/or content platforms, e.g., an SSP 170 and/or one or more DSPs 150. For example, the client device 110 can provide, to the computing systems MPC1 and MPC2, the set of contextual properties along with a digital component request. The content platforms can also infer contextual properties for the environment, as described above. As described above, the contextual properties can include data about the resource with which the digital component will be displayed, data about the user of the client device 110, data about the application 112 that will display the digital component, data about the client device 110, and/or general contextual data (e.g., date and time of day).

The computing system can receive a first secret share of the set of contextual properties. Each other computing system of the MPC cluster 130 can receive a respective second secret share of the set of contextual properties.

The computing system obtains, for each digital component in a set of digital components, at least a first share of an eligibility expression that defines a relationship between a set of eligibility criteria for the digital component (604). As described above, the eligibility expression can include one or more sub-expressions, unary Boolean operators such as NOT, and Boolean operators between pairs of sub-expressions.

The computing system can receive a first secret share of the eligibility expression and a first secret share of the eligibility criteria for the eligibility expression. Each other computing system of the MPC cluster 130 can receive a respective second secret share of the set of eligibility expression and a respective second secret share of the eligibility criteria.

The computing system determines, for each digital component and based on the at least first share of the set of contextual properties and the at least first share of the eligibility expression, at least a first share of an eligibility parameter that indicates whether the digital component is eligible for selection to be displayed at the client device (606). The computing system can determine the first share of the eligibility parameter using the process 500 illustrated in FIG. 5 and described above. Each other computing system of the MPC cluster 130 can determine a second share of the eligibility parameter as part of the process 500.

The computing system performs, in collaboration with each other computing system of the MPC cluster, a secure MPC process to select, as the selected digital component, a given digital component from a set of eligible digital components comprising each digital component having an eligibility parameter that indicates that the digital component is eligible for selection (608). The computing system can select the digital component in collaboration with the other computing systems using the process 400 illustrated in FIG. 4 and described above.

The computing system generates, as a result of the secure MPC process, a first share of a selection result identifying the selected digital component (610). Each other computing system of the MPC cluster 130 generates a respective second share of the selection result. The computing systems can determine the shares of the selection result as part of the process 400 illustrated in FIG. 4 and described above.

The computing system sends, to the client device, the first share of the selection result (612). Each other computing system of the MPC cluster 130 also sends its respective second share of the selection result to the client device. The client device can then access the selected digital component and display the digital component.

In some implementations, the MPC cluster 130 can use garbled circuits for the secure MPC process to determine whether a digital component is a candidate of a selection process, e.g., to determine the secret shares of the candidate parameter for the digital component. As there can be many conditions per digital component, e.g., dozens in some cases, there would be many gates in the garbled circuits for each digital component. Reducing the number of gates will reduce the bandwidth cost to execute the secure MPC protocol and significantly reduce the latency in selecting a digital component.

There are a lot of repetitive calculations and logical AND computations between the same pair of input or intermediate Boolean variables, e.g., for the same digital component or for groups of digital components. A greedy algorithm can be used to avoid duplicated computation of subexpressions and therefore reduces the number of AND operations.

In the processes described above, it can be assumed that the candidate parameter is_dc_a_candidate is in $Z_P$ with values of either zero or one. The MPC cluster 130 will iterate through all cached digital components from the digital component with the selection values (e.g., the portion attributed to the publisher) from highest to lowest. For each cached digital component i, the MPC cluster 130 calculates the accumulated value $acc_i$, then computes $acc_i\!=\!0$) in $Z_P$. The result is converted back to $Z_2$. The conversion from $Z_2$ to $Z_p$ and back increases the protocol complexity. The equality test $acc_i\!=\!0$ in $Z_p$ using garbled circuits can involve log 2(p) gates, which is significant performance and bandwidth cost.

The MPC cluster 130 can keep the candidate parameter is_dc_a_candidate$_i$ in Z2 and calculate the accumulated value $acc_i$ then $acc_i\!=\!0$ in $Z_2$ with Boolean circuits at much lower computation and bandwidth cost. To do this the accumulated value $acc_i$ is limited to two possible values: zero if no candidate digital component has a higher selection value than the current selection value for the current digital component i, or one if at least one candidate digital component has a higher selection value than the current selection value for the current digital component. In the processes described above, the accumulated value could be greater than one as it was incremented for each candidate digital component.

With the updated semantics of the accumulated value acc, the MPC cluster 130 can calculate the accumulated value the winner parameter is_dc_the_winner$_i$ while iterating through all cached digital components, from the highest selection value to the lowest as follows. The accumulated value acc for the digital component having the highest selection value is always zero. No calculation is needed.

The accumulated value acc for the digital component having the second highest selection value is always equal to the value of the candidate parameter is_dc_a_candidate of the digital component having the highest selection value. No calculation is needed for this either.

Assume that the MPC cluster 130 has already calculated the accumulated value acc for the digital component having the n-th highest selection value. The accumulated value acc for the digital component having the (n+1)-th highest selection value can be calculated as $acc_{n+1}\!=\!acc_n$ OR is_dc_a_candidate$_n$. The MPC cluster 130 can further calculate the winner parameter is_dc_a_winner$_{n+1}$=is_dc_a_candidate$_{n+1}$ AND NOT $acc_{n+1}$.

The MPC cluster 130 could have two gates with four wires for each cached digital component, e.g., two input wires (acen and is_dc_a_candidate$_n$) and two output wires ($acc_{n+1}$ and is_dc_a_winner$_{n+1}$). With these enhancements, the MPC cluster 130 needs only two gates per cached digital component instead of dozens of gates each. This cryptographic process can be performed as part of the candidate eligibility determination as described above.

Figure 7:
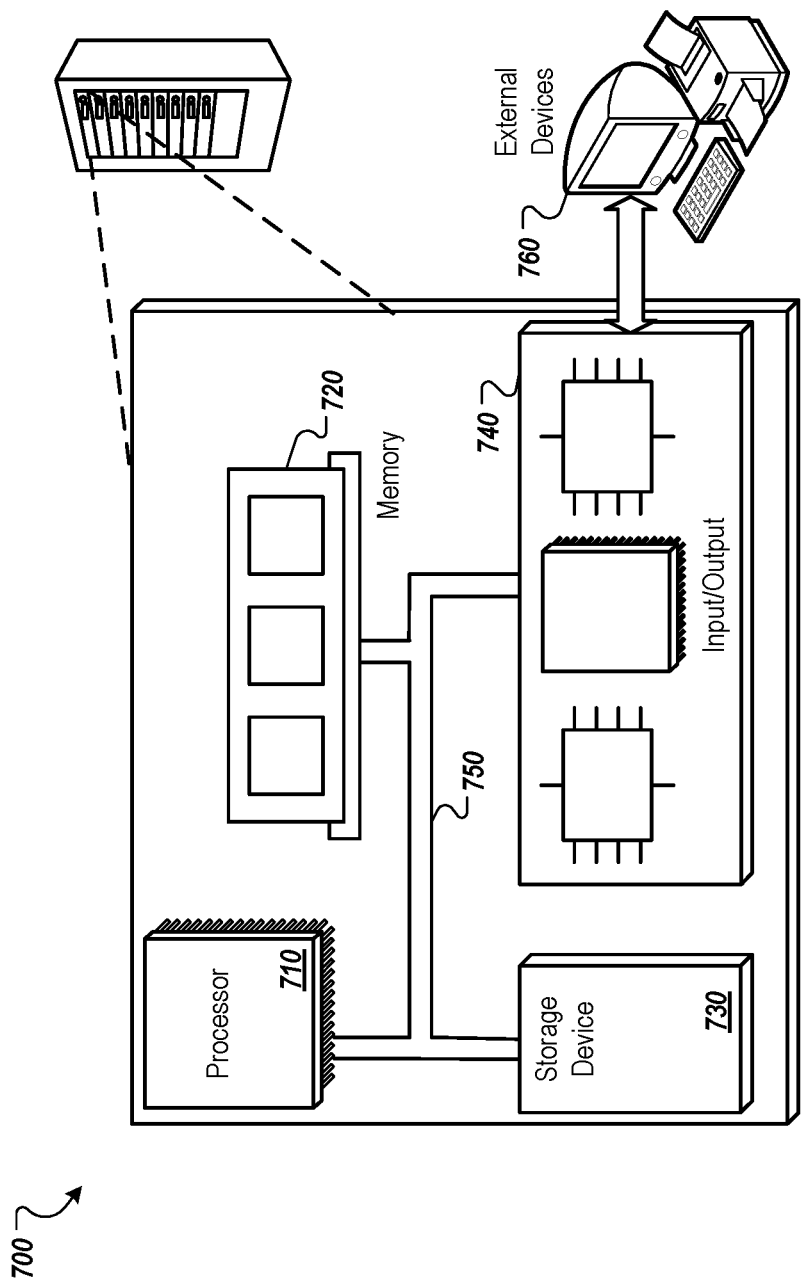
FIG. 7 is a block diagram of an example computer system.

FIG. 7 is a block diagram of an example computer system 700 that can be used to perform operations described above. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In some implementations, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In some implementations, the memory 720 is a volatile memory unit. In another implementation, the memory 720 is a non-volatile memory unit.

The storage device 730 is capable of providing mass storage for the system 700. In some implementations, the storage device 730 is a computer-readable medium. In various different implementations, the storage device 730 can include, for example, a hard disk device, an optical disk device, a storage device that is shared over a network by multiple computing devices (e.g., a cloud storage device), or some other large capacity storage device.

The input/output device 740 provides input/output operations for the system 1000. In some implementations, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 760, e.g., keyboard, printer and display devices. Other implementations, however, can also be used, such as mobile computing devices, mobile communication devices, set-top box television client devices, etc.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks: magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback: and input from the user can be received in any form, including acoustic, speech, or tactile input. In addition, a computer can interact with a user by sending documents to and receiving documents from a device that is used by the user: for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
    obtaining, by a first computer of a secure multi-party computation (MPC) system comprising a plurality of computers, at least a first share of a set of contextual properties of an environment in which a selected digital component will be displayed at a client device;
    for each digital component in a set of digital components:
        obtaining at least a first share of an eligibility expression that defines a relationship between a set of eligibility criteria for the digital component; and
        determining, based on the at least first share of the set of contextual properties and the at least first share of the eligibility expression, at least a first share of an eligibility parameter that indicates whether the digital component is eligible for selection to be displayed at the client device;
    performing, by the first computer in collaboration with one or more second computers of the secure MPC system, a secure MPC process to select, as the selected digital component, a given digital component from a set of eligible digital components comprising each digital component having an eligibility parameter that indicates that the digital component is eligible for selection;
    generating, as a result of the secure MPC process, a first share of a selection result identifying the selected digital component; and
    sending, to the client device by the first computer, the first share of the selection result.

2. The computer-implemented method of claim 1, wherein obtaining the at least first share of the set of contextual properties comprises receiving a first secret share of the set of contextual properties from one of the client device or a content platform.

3. The computer-implemented method of claim 1, wherein:
    the at least first share of the set of contextual properties comprises all of the contextual properties in the set of contextual properties;
    the at least first share of the eligibility expression comprises an entirety of the eligibility expression; and
    determining the at least first share of the eligibility parameter that indicates whether the digital component is eligible for selection comprises evaluating the eligibility expression based on the set of contextual properties in a sandbox environment isolated from other code execution.

4. The computer-implemented method of claim 1, wherein determining, based on the at least first share of the set of contextual properties and the at least first share of the eligibility expression, the at least first share of the eligibility parameter that indicates whether the digital component is eligible for selection comprises performing, in collaboration with the one or more second computers, a second secure MPC process to determine the first secret share of the eligibility parameter.

5. The computer-implemented method of claim 1, wherein:
    the at least first share of the set of eligibility criteria for a particular digital component comprises a first secret share of the vector of properties for the particular digital component;
    the set of contextual properties comprises a vector of the contextual properties;
    the eligibility expression for the particular digital component comprises a set intersection check; and
    determining the at least first share of the eligibility parameter for the particular digital component comprises determining, using a second secure MPC process in collaboration with the one or more second computers of the secure MPC system, that there is an intersection between at least one element of the vector of properties for the particular digital component and at least one element of the vector of the contextual properties.

6. The computer-implemented method of claim 5, wherein:
    the eligibility expression defines the vector of properties for the particular digital component as a block list in which the particular digital component is ineligible for selection when one or more elements of the vector of properties for the particular digital component matches one or more corresponding elements of the vector of the contextual properties; and
    determining the at least first share of the eligibility parameter for the particular digital component comprises setting a value of the at least first share of the eligibility parameter to indicate that the particular digital component is ineligible for selection to be displayed at the client device in response to determining that there is the intersection between the at least one element of the vector of properties for the particular digital component and the at least one element of the vector of the contextual properties.

7. The computer-implemented method of claim 5, wherein:
    the eligibility expression defines the vector of properties for the particular digital component as an enabled list in which the particular digital component is eligible for selection when one or more elements of the vector of properties for the particular digital component matches one or more corresponding elements of the vector of the contextual properties; and
    determining the at least first share of the eligibility parameter for the particular digital component comprises setting a value of the at least first share of the eligibility parameter to indicate that the particular digital component is eligible for selection to be displayed at the client device in response to determining that there is the intersection between the at least one element of the vector of properties for the particular digital component and the at least one element of the vector of the contextual properties.

8. The computer-implemented method of claim 1, wherein:
the at least first share of the set of eligibility criteria for a particular digital component comprises a first secret share of a first Bloom filter comprising properties for the particular digital component;
the set of contextual properties comprises a second Bloom filter comprising the contextual properties;
the eligibility expression for the particular digital component comprises a set intersection check; and
determining the at least first share of the eligibility parameter for the particular digital component comprises determining, using a second secure MPC process in collaboration with the one or more second computers of the secure MPC system, that there is an intersection between at least one element of the first Bloom filter and at least one element of the second Bloom filter.

9. The computer-implemented method of claim 1, wherein the eligibility expression for a particular digital component comprises a comparison between a given property for the digital component and a corresponding property of the set of contextual properties.

10. The computer-implemented method of claim 1, wherein the eligibility expression for a particular digital component comprises an equality test between a given property for the digital component and a corresponding property of the set of contextual properties.

11. The computer-implemented method of claim 1, wherein the eligibility expression for a particular digital component comprises a truth table that defines when the particular digital component is eligible for selection.

12. The computer-implemented method of claim 1, wherein the eligibility expression comprises a Boolean expression comprising two or more sub-expressions and a Boolean operator for each pair of sub-expressions.

13. The computer-implemented method of claim 12, wherein the two or more sub-expressions comprise two or more of (i) a set intersection check, (ii) an equality test, and (iii) a comparison test.

14. The computer-implemented method of claim 1, wherein the set of contextual properties comprises at least one of (i) data about a resource with which the selected digital component will be displayed, (ii) data about a user of the client device, (iii) data about an application that will display the digital component, or (iv) data about the client device.

15. A system comprising:
one or more processors; and
one or more storage devices storing instructions that, when executed by the one or more processors of a first computer, cause the one or more processors to perform operations comprising:
obtaining, by the first computer of a secure multi-party computation (MPC) system comprising a plurality of computers, at least a first share of a set of contextual properties of an environment in which a selected digital component will be displayed at a client device;
for each digital component in a set of digital components:
obtaining at least a first share of an eligibility expression that defines a relationship between a set of eligibility criteria for the digital component; and
determining, based on the at least first share of the set of contextual properties and the at least first share of the eligibility expression, at least a first share of an eligibility parameter that indicates whether the digital component is eligible for selection to be displayed at the client device;
performing, by the first computer in collaboration with one or more second computers of the secure MPC system, a secure MPC process to select, as the selected digital component, a given digital component from a set of eligible digital components comprising each digital component having an eligibility parameter that indicates that the digital component is eligible for selection;
generating, as a result of the secure MPC process, a first share of a selection result identifying the selected digital component; and
sending, to the client device by the first computer, the first share of the selection result.

16. The system of claim 15, wherein obtaining the at least first share of the set of contextual properties comprises receiving a first secret share of the set of contextual properties from one of the client device or a content platform.

17. The system of claim 15, wherein:
the at least first share of the set of contextual properties comprises all of the contextual properties in the set of contextual properties;
the at least first share of the eligibility expression comprises an entirety of the eligibility expression; and
determining the at least first share of the eligibility parameter that indicates whether the digital component is eligible for selection comprises evaluating the eligibility expression based on the set of contextual properties in a sandbox environment isolated from other code execution.

18. The system of claim 15, wherein determining, based on the at least first share of the set of contextual properties and the at least first share of the eligibility expression, the at least first share of the eligibility parameter that indicates whether the digital component is eligible for selection comprises performing, in collaboration with the one or more second computers, a second secure MPC process to determine the first secret share of the eligibility parameter.

19. The system of claim 15, wherein:
the at least first share of the set of eligibility criteria for a particular digital component comprises a first secret share of the vector of properties for the particular digital component;
the set of contextual properties comprises a vector of the contextual properties;
the eligibility expression for the particular digital component comprises a set intersection check; and
determining the at least first share of the eligibility parameter for the particular digital component comprises determining, using a second secure MPC process in collaboration with the one or more second computers of the secure MPC system, that there is an intersection between at least one element of the vector of properties for the particular digital component and at least one element of the vector of the contextual properties.

20. A non-transitory computer readable storage medium carrying instructions that, when executed by one or more processors of a first computer, cause the one or more processors to perform operations comprising:
obtaining, by the first computer of a secure multi-party computation (MPC) system comprising a plurality of computers, at least a first share of a set of contextual properties of an environment in which a selected digital component will be displayed at a client device;

for each digital component in a set of digital components:
obtaining at least a first share of an eligibility expression that defines a relationship between a set of eligibility criteria for the digital component; and
determining, based on the at least first share of the set of contextual properties and the at least first share of the eligibility expression, at least a first share of an eligibility parameter that indicates whether the digital component is eligible for selection to be displayed at the client device;

performing, by the first computer in collaboration with one or more second computers of the secure MPC system, a secure MPC process to select, as the selected digital component, a given digital component from a set of eligible digital components comprising each digital component having an eligibility parameter that indicates that the digital component is eligible for selection;

generating, as a result of the secure MPC process, a first share of a selection result identifying the selected digital component; and sending, to the client device by the first computer, the first share of the selection result.

* * * * *

UNITED STATES PATENT AND TRADEMARK OFFICE
CERTIFICATE OF CORRECTION

PATENT NO. : 12,200,100 B2
APPLICATION NO. : 17/927049
DATED : January 14, 2025
INVENTOR(S) : Wang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this
Third Day of June, 2025

Coke Morgan Stewart
*Acting Director of the United States Patent and Trademark Office*